United States Patent
Sato et al.

(10) Patent No.: US 11,922,649 B2
(45) Date of Patent: Mar. 5, 2024

(54) MEASUREMENT DATA CALCULATION APPARATUS, PRODUCT MANUFACTURING APPARATUS, INFORMATION PROCESSING APPARATUS, SILHOUETTE IMAGE GENERATING APPARATUS, AND TERMINAL APPARATUS

(71) Applicant: Arithmer Inc., Tokyo (JP)

(72) Inventors: Daisuke Sato, Tokyo (JP); Hiroki Yato, Gunma (JP); Chikashi Arita, Tokyo (JP); Yoshihisa Ishibashi, Tokyo (JP); Takashi Nakano, Kagoshima (JP); Ryosuke Sasaki, Kanagawa (JP); Ryosuke Tajima, Tokyo (JP); Yoshihiro Ohta, Tokyo (JP)

(73) Assignee: Arithmer Inc., Tokyo (JP)

( * ) Notice: Subject to any disclaimer, the term of this patent is extended or adjusted under 35 U.S.C. 154(b) by 414 days.

(21) Appl. No.: 17/333,008

(22) Filed: May 27, 2021

(65) Prior Publication Data

US 2021/0312649 A1    Oct. 7, 2021

Related U.S. Application Data

(63) Continuation of application No. PCT/JP2019/046896, filed on Nov. 29, 2019.

(30) Foreign Application Priority Data

Nov. 30, 2018  (JP) .................................. 2018-224376
Apr. 24, 2019  (JP) .................................. 2019-082513
(Continued)

(51) Int. Cl.
*G06T 7/536*    (2017.01)
*G06T 3/40*     (2006.01)
(Continued)

(52) U.S. Cl.
CPC ................ *G06T 7/536* (2017.01); *G06T 3/40* (2013.01); *G06T 7/11* (2017.01); *G06T 7/55* (2017.01);
(Continued)

(58) Field of Classification Search
CPC . G06T 2207/10016; G06T 2207/10028; G06T 2207/20084; G06T 2207/30196;
(Continued)

(56) References Cited

U.S. PATENT DOCUMENTS

2013/0336582 A1    12/2013  Dai
2015/0055086 A1*   2/2015  Fonte ...................... G06F 16/22
                                                        700/98
(Continued)

FOREIGN PATENT DOCUMENTS

JP    2000254123 A    9/2000
JP    2005315846 A    11/2005
(Continued)

OTHER PUBLICATIONS

Office Action issued for counterpart Japanese Application No. 2018-224376, drafted by the Japanese Patent Office dated Feb. 13, 2019.
(Continued)

*Primary Examiner* — Ruiping Li

(57) ABSTRACT

It provides the measurement data of each portion of the target object with a high accuracy. The measurement data calculation apparatus 1020 includes an obtaining unit 1024A, an extraction unit 1024B, a conversion unit 1024C, and a calculation unit 1024D. The obtaining unit 1024A obtains the image data in which the target object is photographed and the full length data of the target object. The extraction unit 1024B extracts the shape data indicating the shape of the target object from the image data. The conver- (Continued)

sion unit 1024C converts and silhouettes the shape data based on the full length data. The calculation unit 1024D uses the shape data converted by the conversion unit 1024C to calculate the measurement data of each portion of the target object.

19 Claims, 26 Drawing Sheets

(30) Foreign Application Priority Data

Apr. 26, 2019 (JP) ................................. 2019-086892
Oct. 10, 2019 (JP) ................................. 2019-186653

(51) Int. Cl.
*G06T 7/11* (2017.01)
*G06T 7/55* (2017.01)
*G06T 7/60* (2017.01)

(52) U.S. Cl.
CPC ...... *G06T 7/60* (2013.01); *G06T 2207/10028* (2013.01); *G06T 2207/30196* (2013.01)

(58) Field of Classification Search
CPC ... G06T 3/40; G06T 7/11; G06T 7/536; G06T 7/55; G06T 7/60
See application file for complete search history.

(56) References Cited

U.S. PATENT DOCUMENTS

| | | | |
|---|---|---|---|
| 2015/0062301 A1 | 3/2015 | Lin | |
| 2015/0150457 A1 | 6/2015 | Wu | |
| 2015/0154453 A1 | 6/2015 | Wilf | |
| 2015/0223730 A1 | 8/2015 | Ferrantelli | |
| 2016/0210602 A1* | 7/2016 | Siddique | ................. G06T 17/00 |
| 2018/0374231 A1 | 12/2018 | Znamenskiy | |
| 2019/0060755 A1 | 2/2019 | Motokura | |
| 2019/0370641 A1 | 12/2019 | Fukui | |

FOREIGN PATENT DOCUMENTS

| | | | |
|---|---|---|---|
| JP | 2008276348 A | 11/2008 |
| JP | 2011227692 A | 11/2011 |
| JP | 2013009864 A | 1/2013 |
| JP | 2013196355 A | 9/2013 |
| JP | 2013228334 A | 11/2013 |
| JP | 2013235537 A | 11/2013 |
| JP | 2013257843 A | 12/2013 |
| JP | 2015534637 A | 12/2015 |
| JP | 2017018158 A | 1/2017 |
| JP | 2017504370 A | 2/2017 |
| JP | 2017162251 A | 9/2017 |
| JP | 2018121697 A | 8/2018 |
| JP | 2018180662 A | 11/2018 |
| JP | 2018536234 A | 12/2018 |
| JP | 2019037614 A | 3/2019 |
| WO | 2017168805 A1 | 10/2017 |
| WO | 2017179728 A1 | 10/2017 |
| WO | 2018163790 A1 | 9/2018 |

OTHER PUBLICATIONS

Office Action issued for counterpart Japanese Application No. 2019-082513, drafted by the Japanese Patent Office dated Jun. 3, 2019.
Office Action issued for counterpart Japanese Application No. 2019-186653, drafted by the Japanese Patent Office dated Dec. 24, 2019.
Office Action issued for counterpart Japanese Application No. 2019-186653, drafted by the Japanese Patent Office dated May 13, 2020.
International Preliminary Report on Patentability for International Application No. PCT/JP2019/046896, issued by the International Bureau of WIPO dated May 25, 2021.

* cited by examiner $$\begin{pmatrix} x1^2 & x2^2 & x3^2 \\ x1 \cdot x2 & x2 \cdot x3 & x3 \cdot x1 \\ x1 & x2 & x3 \end{pmatrix}$$

Fig. 13
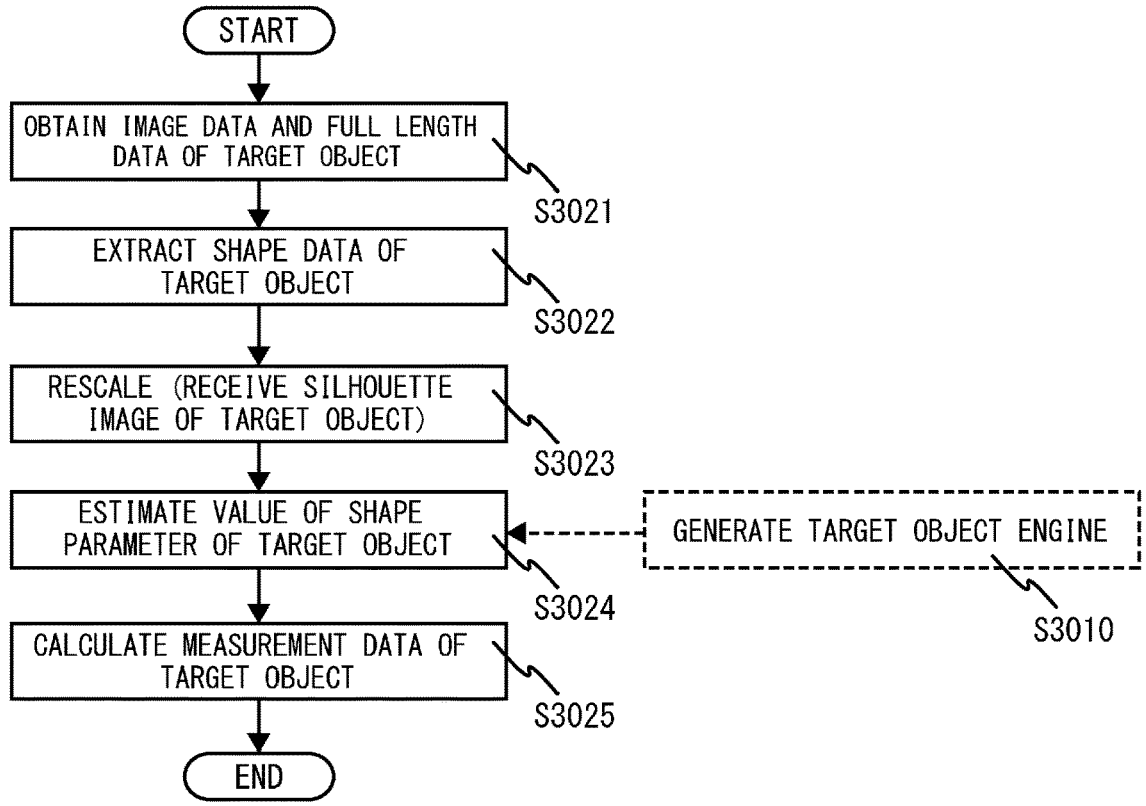
Fig. 14
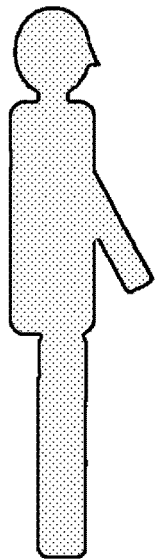
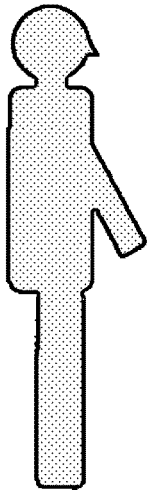
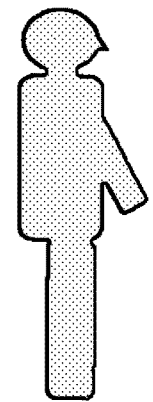

MEASUREMENT DATA CALCULATION APPARATUS, PRODUCT MANUFACTURING APPARATUS, INFORMATION PROCESSING APPARATUS, SILHOUETTE IMAGE GENERATING APPARATUS, AND TERMINAL APPARATUS

The contents of the following Japanese patent application are incorporated herein by reference:
NO. 2018-224376 filed in JP on Nov. 30, 2018,
NO. 2019-082513 filed in JP on Apr. 24, 2019,
NO. 2019-086892 filed in JP on Apr. 26, 2019,
NO. 2019-186653 filed in JP on Oct. 10, 2019, and
NO. PCT/JP2019/046896 filed in WO on Nov. 29, 2019.

BACKGROUND

1. Technical Field

The present disclosure relates to a measurement data calculation apparatus, a product manufacturing apparatus, an information processing apparatus, a silhouette image generating apparatus, and a terminal apparatus.

2. Related Art

Conventionally, an apparatus has been proposed which is used to manufacture a product based on the shape of a target object. For example, patent document 1 discloses a technology which photographs a nail of a finger to obtain a nail image, obtains nail information, such as the shape of the nail, the position of the nail, the curvature of the nail, or the like, necessary for producing a fake nail, based on the obtained nail image, stores the nail information, and produces parts of the fake nail based on this nail information.

Patent document 1: Japanese Patent Application Publication No. 2017-018158

BRIEF DESCRIPTION OF THE DRAWINGS

FIG. 13 is a flowchart showing the operation of a measurement data calculation apparatus 3020 in FIG. 11.

FIG. 14 is a schematic explanatory view showing the characteristics of a shape parameter.

DESCRIPTION OF EXEMPLARY EMBODIMENTS

Figure 1:
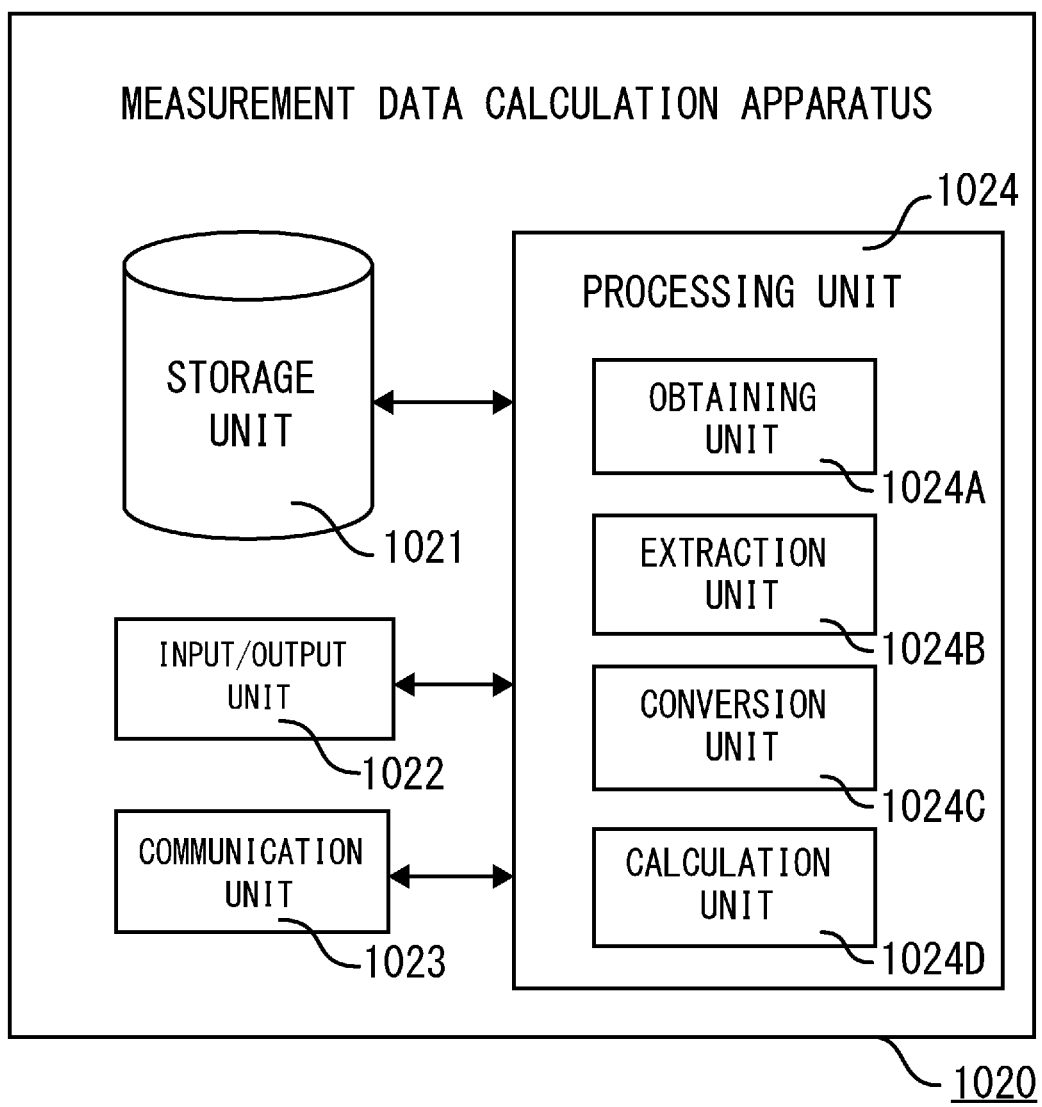
FIG. 1 is a schematic view showing the configuration of a measurement data calculation apparatus 1020 according to a first embodiment.

First Embodiment (1-1) The Configuration of the Measurement Data Calculation Apparatus FIG. 1 is a schematic view showing the configuration of the measurement data calculation apparatus 1020 according to the present embodiment.

The measurement data calculation apparatus 1020 can be achieved by any computer and includes a storage unit 1021, an input/output unit 1022, a communication unit 1023, and a processing unit 1024. It should be noted that the measurement data calculation apparatus 1020 may also be achieved as hardware using an LSI (Large Scale Integration), an ASIC (Application Specific Integrated Circuit), an FPGA (Field-Programmable Gate Array), or the like.

The storage unit 1021 stores various types of information and is achieved by any storage apparatus such as a memory and a hard disk. For example, the storage unit 1021 stores a weighting factor necessary for performing the information processing described later, the weighting factor being associated with the length, weight, and the like of the target object. It should be noted that the weighting factor is obtained in advance by performing machine learning using teacher data including the attribute data, the image data, and the measurement data which are described later.

The input/output unit 1022 is achieved by a keyboard, a mouse, a touch panel, or the like and inputs various types of information to a computer and/or outputs various types of information from the computer. The communication unit 1023 is achieved by any network card or the like and enables the communication with a communication appliance on the network through a wired or wireless manner.

The processing unit 1024 performs various types of information processing and is achieved by a processor, such as a CPU or GPU, and a memory. Herein, the program stored in the storage unit 1021 is read by a CPU, a GPU, or the like of the computer so that the processing unit 1024 serves as an obtaining unit 1024A, an extraction unit 1024B, a conversion unit 1024C, and a calculation unit 1024D.

The obtaining unit 1024A obtains the image data in which a target object is photographed, and the full length data, the weight data, and the like of the target object. It should be noted that herein the obtaining unit 1024A obtains a plurality of image data in which the target object is photographed in different directions.

The extraction unit 1024B extracts the shape data indicating the shape of the target object from the image data. Specifically, the extraction unit 1024B uses an algorithm of semantic segmentation, such as Mask R-CNN, prepared for each type of a target object to extract the target object area included in the image data so as to extract the shape data of the target object. Herein, the algorithm of the semantic segmentation is built using teacher data for which the shape of the target object is not identified.

It should be noted that if the algorithm of the semantic segmentation has been built using the teacher data of the target object whose shape is not identified the shape of the target object cannot be necessarily extracted with a high accuracy. In such a case, the extraction unit 1024B extracts the shape data of the target object from the target object area using the GrabCut algorithm. This allows the shape of the target object to be extracted with a high accuracy. Furthermore, the extraction unit 1024B may correct the image of the target object identified with the GrabCut algorithm, based on the color image of the identified portion of the target object. This allows the shape data of the target object to be generated with an even higher accuracy.

The conversion unit 1024C converts and silhouettes the shape data based on the full length data. In this way, the shape data is normalized.

The calculation unit 1024D uses the shape data converted by the conversion unit 1024C to calculate the measurement data for each portion of the target object. Specifically, the calculation unit 1024D performs dimensionality reduction on the shape data converted by the conversion unit 1024C. Herein, the dimensionality reduction is achieved with an approach such as principal component analysis, particularly kernel principal component analysis (KernelPCA), linear discriminant analysis, or the like.

The calculation unit 1024D then uses the value of each dimension which has been reduced and the weighting factor optimized for each portion of the target object to calculate the measurement data for each portion of the target object.

In more detail, the calculation unit 1024D obtains a predetermined value $Zpi$ through the linear combination of the value of each dimension which has been reduced at a first time and the weighting factor $W1pi$ optimize for each portion of the target object. It should be noted that the symbol p is the number of dimensions obtained after the reduction and is a value more than or equal to ten. The calculation unit 1024D then uses the predetermined value $Zpi$ and the attribute data which includes at least the attribute of the length and the weight of the target object to perform the second dimensionality reduction and calculates the measurement data of each portion of the target object based on the value of each dimension obtained through the second dimensionality reduction. It should be noted that the weighting factors $W1pi$ are prepared for each of i dimension spots of the target object with the same quantity as the number of dimensions which has been reduced.

It should be noted that in the above description the calculation unit 1024D uses the linear combination to obtain the predetermined value $Zpi$, but the calculation unit 1024D may obtain these values with an approach other than the linear combination. Specifically, the calculation unit 1024D may generate a secondary feature value from the value of each dimension obtained through the dimensionality reduction and combine the secondary feature value and the weighting factor optimized for each portion of the target object so as to obtain the predetermined value.

(1-2) The Operation of Measurement Data Calculation Apparatus

Figure 2:
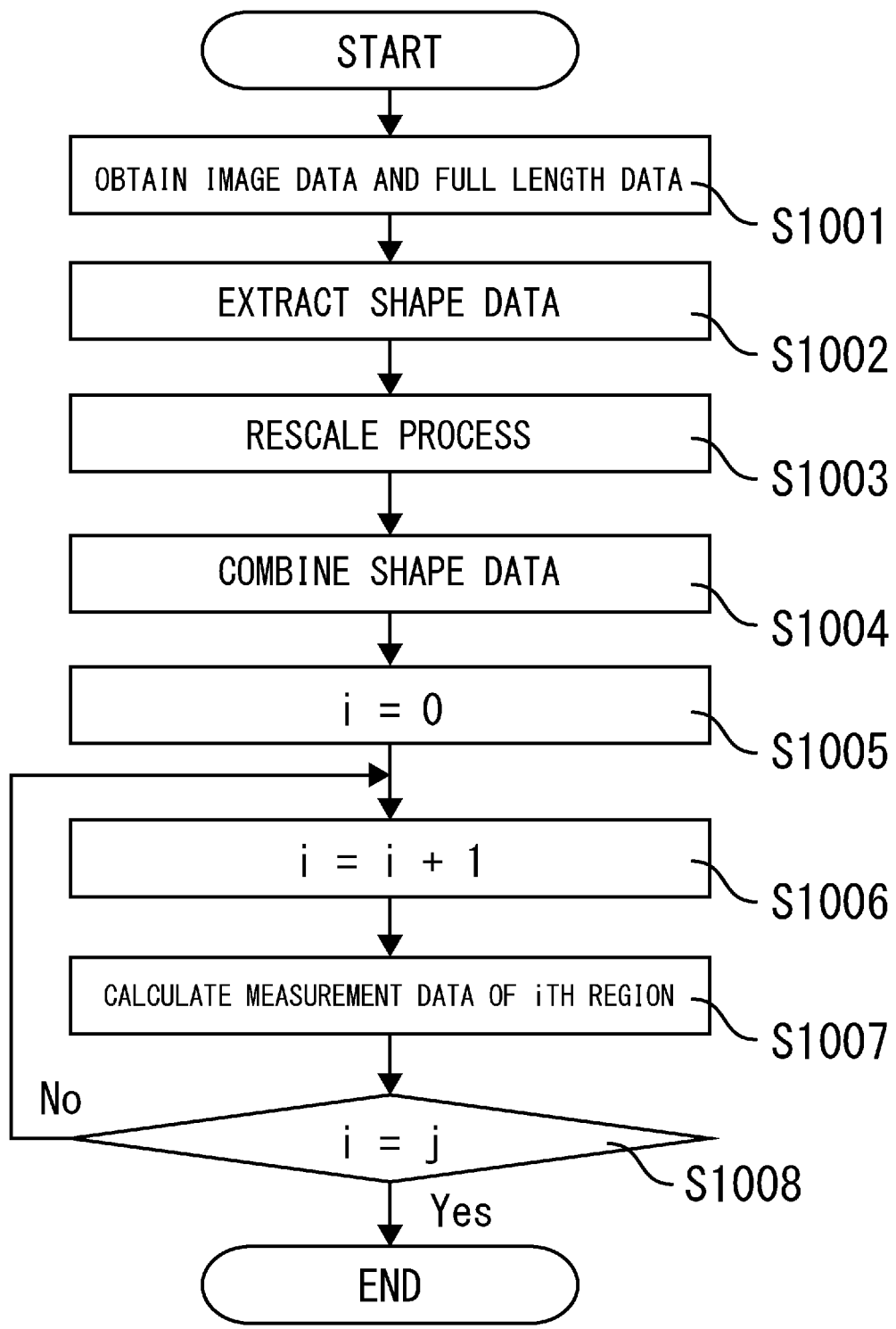
FIG. 2 is a flowchart for describing the operation of the measurement data calculation apparatus 1020 according to the embodiment.

FIG. 2 is a flowchart for describing the operation of the measurement data calculation apparatus 1020 according to the present embodiment.

The measurement data calculation apparatus 1020 first obtains a plurality of image data in which the entire target object has been photographed in different directions via an external terminal apparatus or the like, together with the full length data indicating the full length of the target object (S1001).

The measurement data calculation apparatus 1020 then extracts, from each image data, each shape data indicating the shape of each portion of the target object (S1002). The measurement data calculation apparatus 1020 subsequently performs rescale process for converting each shape data into the data having a predetermined size based on the full length data (S1003).

Figure 3:
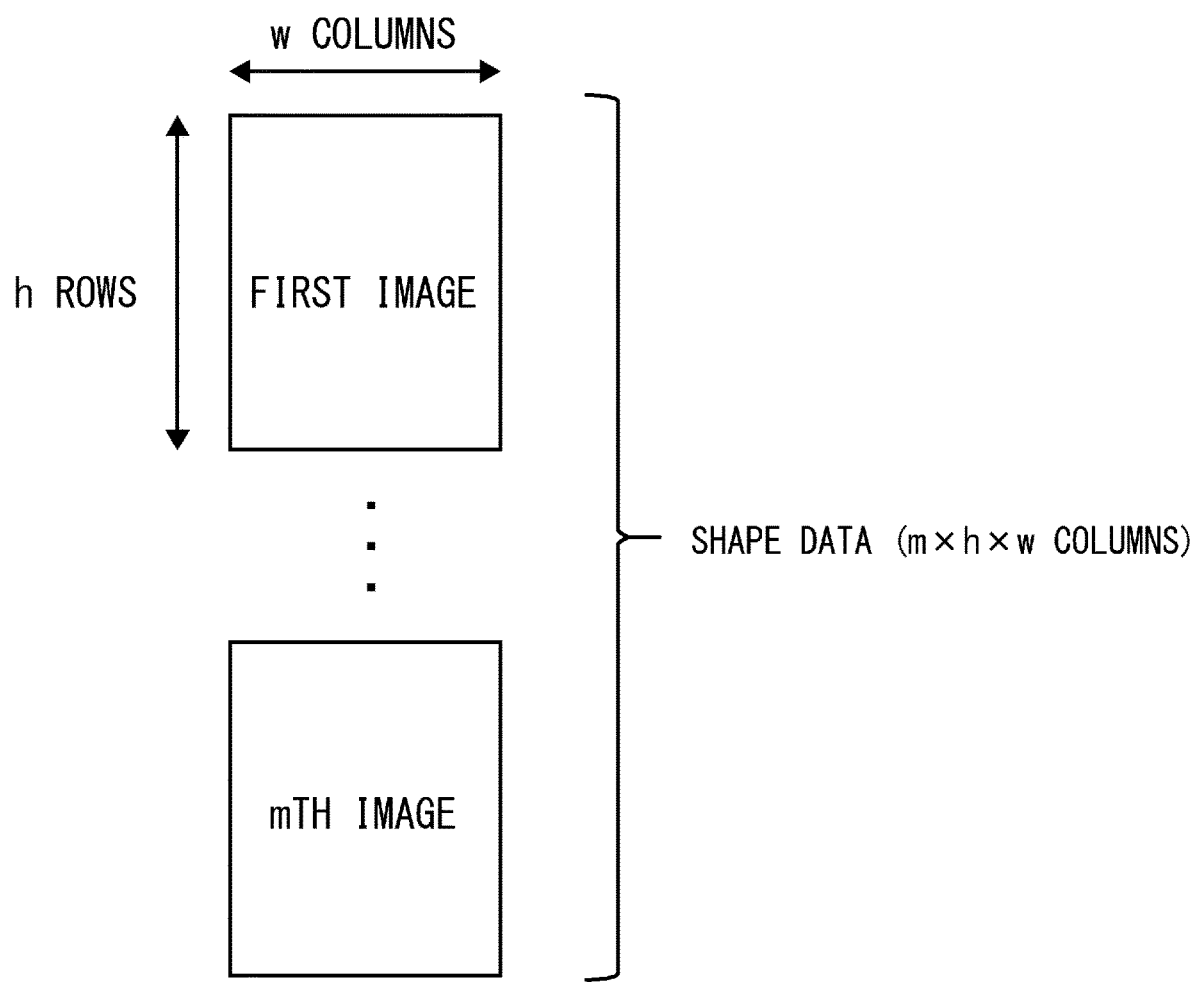
FIG. 3 is a schematic view showing the concept of the shape data according to the embodiment.

The measurement data calculation apparatus 1020 then combines a plurality of shape data after the conversion and generates new shape data (in the following, also referred to as the shape data for calculation). Specifically, as shown in FIG. 3, the shape data with h rows and w columns is combined into the data array with m×h×w. It should be noted that the symbol m is the quantity of the shape data (S1004).

The measurement data calculation apparatus 1020 subsequently uses the newly generated shape data and the weighting factor $W1pi$ optimized for each portion of the target object to calculate the measurement data for each ith (i=1~j) portion in the target object (S1005 to S1008). It should be noted that the symbol j is the total number of the dimension spots for which the measurement data is to be calculated.

(1-3) The Characteristics of Measurement Data Calculation Apparatus (1-3-1) As described above, the measurement data calculation apparatus 1020 according to the present embodiment includes an obtaining unit 1024A, an extraction unit 1024B, a conversion unit 1024C, and a calculation unit 1024D. The obtaining unit 1024A obtains the image data in which the target object has been photographed and the full length data of the target object. The extraction unit 1024B extracts, from the image data, the shape data indicating the shape of the target object. The conversion unit 1024C converts and silhouettes the shape data based on the full length data. The calculation unit 1024D uses the shape data converted by the conversion unit 1024C to calculate the measurement data for each portion of the target object.

Therefore, since the measurement data calculation apparatus 1020 calculates the measurement data for each portion of the target object using the image data and the full length data, it can provide the measurement data with a high accuracy. In addition, since the measurement data calculation apparatus 1020 can perform information processing on a large number of the image data and the full length data at once, it can provide a large number of measurement data with a high accuracy.

Then, using such measurement data calculation apparatus 1020, for example, the measurement data for each portion of the living thing as the target object can be calculated with a high accuracy. In addition, the measurement data for each portion of any object such as a car, various types of cargo, or the like as the target object can be calculated with high accuracy. In addition, the measurement data calculation apparatus is incorporated into the product manufacturing apparatus for manufacturing various types of products so that the product adapted to the shape of the target object can be manufactured.

(1-3-2) In addition, in the measurement data calculation apparatus 1020, the obtaining unit 1024A obtains a plurality of image data in which the target object is photographed in different directions. Such an configuration can increase the accuracy of the measurement data.

(1-3-3) In addition, in the measurement data calculation apparatus 1020, the calculation unit 1024D performs the dimensionality reduction on the shape data converted by the conversion unit 1024C. The calculation unit 1024D then uses the value of each dimension which has been reduced and the weighting factor W1pi optimized for each portion of the target object to calculate the measurement data for each portion of the target object. Such an configuration can increase the accuracy of the measurement data while preventing the increase in the computational load.

In detail, the calculation unit 1024D obtains the predetermined value Zi by performing linear combination on the value of each dimension that has been reduced and the weighting factor W1pi optimized for the ith portion of the target object. In addition, the calculation unit 1024D uses the predetermined value Zi and the attribute data including at least the attribute of the length and the weight of the target object to perform the second dimensionality reduction and calculates the ith measurement data of the target object. Such an configuration can further increase the accuracy of the measurement data while preventing the increase in the computational load. It should be noted that in the above description the calculation unit 1024D may, instead of using the linear combination, generate the secondary feature value from the value of each dimension obtained through the dimensionality reduction and combine the secondary feature value and the weighting factor optimized for each portion of the target object to obtain the predetermined value.

(1-3-4) In addition, in the measurement data calculation apparatus 1020, the extraction unit 1024B uses the algorithm of semantic segmentation which is built using the teacher data prepared for each type of the target object to extract the target object area included in the image data so as to extract the shape data of the target object. Such an configuration can increase the accuracy of the measurement data.

It should be noted that some algorithms of semantic segmentation are available to the public but the algorithms available to the public are typically built using the teacher data in which the shape of the target object is not identified. Therefore, depending on the objective, the accuracy with which the target object area included in the image data is extracted is not necessarily enough.

Thus, in such a case, the extraction unit 1024B extracts the shape data of the target object from the target object area through the GrabCut algorithm. Such an configuration can further increase the accuracy of the measurement data.

Furthermore, the extraction unit 1024B may correct the image of the target object extracted through the GrabCut algorithm based on the color image of the identified portion in the image data and generate new shape data. Such an configuration can further increase the accuracy of the measurement data. For example, if the target object is a person, the hand and the back are set as the identified portion and the correction is performed based on the color image of these identified portion so that the shape data of the person as the target object can be obtained with a high accuracy.

(1-4) Variation (1-4-1) Although in the above description the obtaining unit 1024A obtains a plurality of image data in which the target object is photographed in different directions, the plurality of image data is not necessarily required. One image data of the target object can also allow the calculation of the measurement data for each portion.

As a variation of the present embodiment, a depth data measurement apparatus can be applied which can also obtain depth data and the depth map having depth data for each pixel may be constructed based on the depth data. Such a depth data measurement apparatus is applied so that the image data which can be obtained by the obtaining unit 1024A can be RGB-D (Red, Green, Blue, Depth) data. Specifically, the image data can include the depth map in addition to the RGB image data which can be obtained with a typical monocular camera.

One example of the depth data measurement apparatus is a stereo camera. In this specification, the "stereo camera" means an image capture apparatus in any form which can photograph the target object in a plurality of different directions at the same time and construct the depth map by reproducing the binocular disparity. In addition, besides the stereo camera, a LiDAR (Light Detection and Ranging) apparatus can be used to obtain the depth data and construct the depth map.

(1-4-2) In the above description, the shape data of the target object may be obtained by employing the semantic segmentation algorithm and/or the GrabCut algorithm. Additionally or alternatively, for example, if the stereo camera is applied, the depth map obtained from the stereo camera can be used to associate the depth data of the target object with the shape data of the target object. This can generate the shape data of the target object with an even higher accuracy.

Specifically, if the stereo camera is used, the extraction unit 1024B extracts, from the image data in which the target object is photographed, the target object area that is the portion in which the target object is captured, based on the depth map obtained by the obtaining unit 1024A. For example, the regions in which the depth data is not in a predetermined range are eliminated from the depth map so that the target object area is extracted. In the extracted target object area, the shape data is associated with the depth data of the target object for each pixel.

The conversion unit 1024C converts the shape data based on the full length data. In addition, the conversion unit 1024C converts the shape data into the monochrome image data based on the depth data of the target object area in addition to the full length data and generates the "gradation silhouette image" (new shape data), which will be described later.

The gradation silhouette image to be generated is not a mere binarized data of black and white but is a monochrome image with single color multiple gradation in which for example the luminance value is represented with the data from 0 (black) to 1 (white) based on the depth data. In other words, the gradation silhouette image data is associated with the depth data and has even more amount of information about the shape of the target object. It should be noted that the gradation silhouette image data is normalized with the full length data.

According to this variation, the target object area is extracted based on the depth map constructed using as the obtaining unit 1024A any machine which can measure the depth data, so that the shape data of the target object can be extracted with an even higher accuracy. In addition, since the gradation silhouette image data (the shape data to be converted) is associated with the depth data of the target object, it has even more amount of information about the shape of the target object, and the calculation unit 1024D can calculate the measurement data of each portion of the target object with an even higher accuracy.

In more detail, the calculation unit 1024D performs the dimensionality reduction on the gradation silhouette image data (shape data) converted by the conversion unit 1024C. In this case, the number of dimensions reduced at the first time is about 10 times greater than that of the silhouette image of the binarized data. In addition, the quantity of the weighting factor is prepared depending on the dimension which has been reduced, for each of i dimension spots of the target object.

It should be noted that the gradation silhouette image has been distinguished from a mere silhouette image in the above description, but in another embodiment and in another variation the both may not be distinguished but described as a mere silhouette image.

(1-4-3) In the above description, the calculation unit 1024D performs the dimensionality reduction twice, but such process is not necessarily required. The calculation unit 1024D may calculate the measurement data for each portion of the target object from the value of each dimension obtained by performing the dimensionality reduction once. In addition, depending on the objective, the measurement data calculation apparatus 1020 may calculate the measurement data without performing the dimensionality reduction on the shape data.

(1-4-4) Although in the above description the extraction unit 1024B uses the algorithm of semantic segmentation built using the teacher data in which the shape of the target object is not identified to extract the target object area included in the image data, such teacher data is not necessarily required to be utilized. For example, the algorithm of semantic segmentation built using the teacher data in which the shape of the target object is identified may be used. When the teacher data in which the shape of the target object is identified is used, the accuracy of the calculation of the measurement data can be increased and the increase in the computational load can be prevented, depending on the objective.

(1-5) The Application to the Product Manufacturing System

In the following, the example is described in which the above described measurement data calculation apparatus 1020 is applied to the product manufacturing system 1001.

(1-5-1) The Configuration of the Product Manufacturing System

Figure 4:
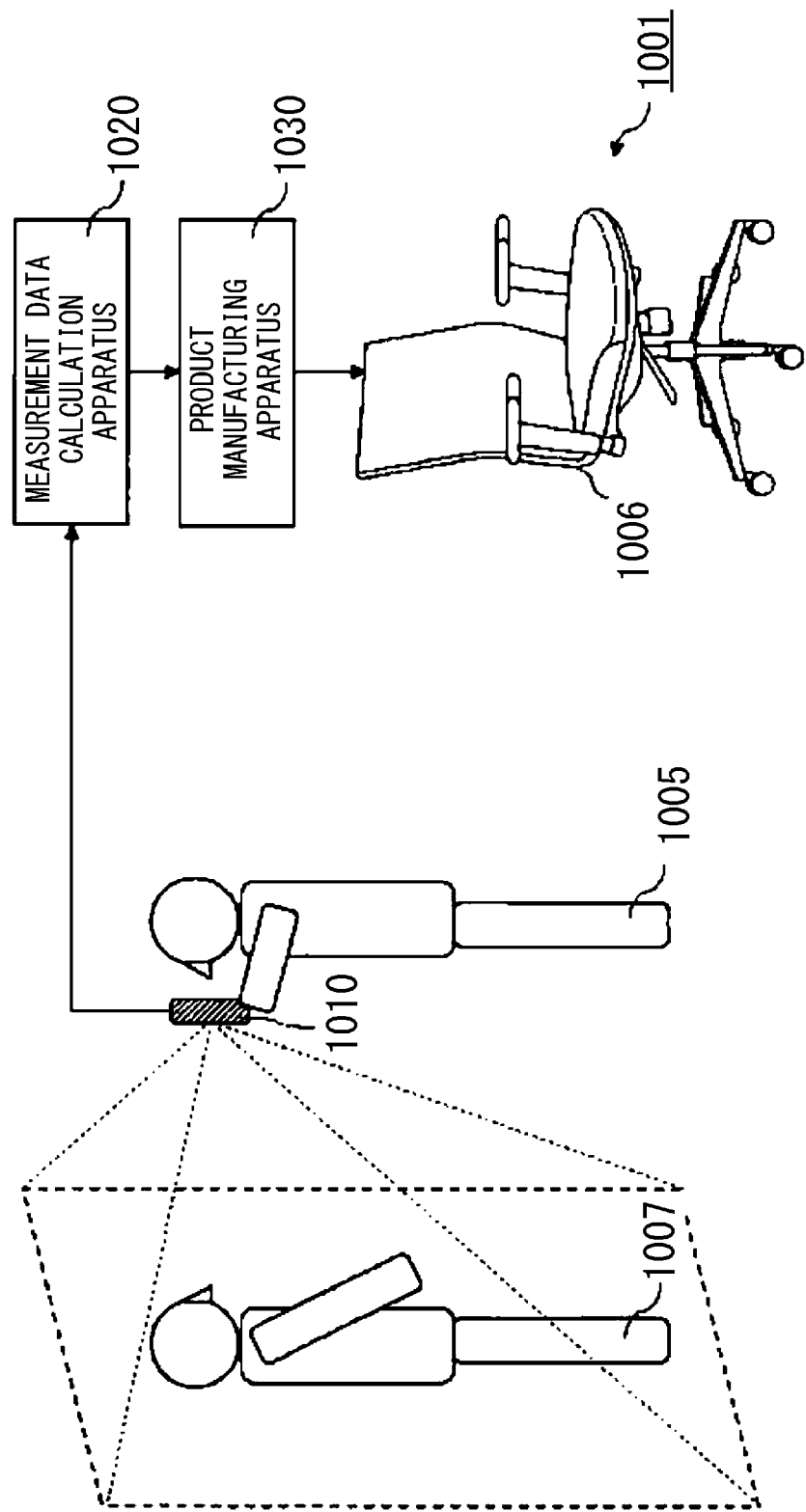
FIG. 4 is a schematic view showing the concept of a product manufacturing system 1001 according to the embodiment.

FIG. 4 is the schematic view showing the concept of the product manufacturing system 1001 according to the present embodiment.

The product manufacturing system 1001 is a system that includes a measurement data calculation apparatus 1020 which can communicate with the terminal apparatus 1010 possessed by a user 1005, and a product manufacturing apparatus 1030, and that is configured to manufacture the desired product 1006. FIG. 4 shows the concept in a case where, as one example, the target object 1007 is a person and the product 1006 is a chair. However, the target object 1007 and the product 1006 for the product manufacturing system according to the present embodiment are not limited thereto.

The terminal apparatus 1010 can be achieved by a so-called smart device. Herein, the program for a user is installed on the smart device so that the terminal apparatus 1010 can offer various types of functions. Specifically, the terminal apparatus 1010 generates the image data captured by the user 1005. Herein, the terminal apparatus 1010 may have a stereo camera function which photographs the target object in a plurality of different directions at the same time to reproduce the binocular disparity. It should be noted that the image data is not limited to those photographed by the terminal apparatus 1010 but, for example, those photographed using the stereo camera installed in a store may be utilized.

In addition, the terminal apparatus 1010 receives the input of the attribute data indicating the attribute of the target object 1007. The "attribute" includes the full length, the weight, the elapsed time since generation (including the age), and the like of the target object 1007. In addition, the terminal apparatus 1010 has a communication function and performs the transmission and reception of various types of information to and from the measurement data calculation apparatus 1020 and the product manufacturing apparatus 1030.

The measurement data calculation apparatus 1020 can be achieved by any computer. Herein, the storage unit 1021 of the measurement data calculation apparatus 1020 stores the information transmitted from the terminal apparatus 1010, the information being associated with the identification information which identifies the user 1005 of the terminal apparatus 1010. In addition, the storage unit 1021 stores the parameter or the like required for performing the information processing described later. For example, the storage unit 1021 stores the weighting factor W1pi required for performing the information processing described later, the weighting factor being associated with the item of the attribute or the like of the target object 1007.

In addition, as described above, the processing unit 1024 of the measurement data calculation apparatus 1020 serves as an obtaining unit 1024A, an extraction unit 1024B, a conversion unit 1024C, and a calculation unit 1024D. Herein, the obtaining unit 1024A obtains the image data photographed by the user 1005 and the attribute data of the target object 1007. In addition, the extraction unit 1024B extracts, from the image data, the shape data indicating the shape of the target object 1007. For example, if "a person" is preset as the type of the target object, the algorithm of semantic segmentation is built using the teacher data for identifying the person. In addition, the extraction unit 1024B corrects the image of the target object 1007 identified through the GrabCut algorithm based on the color image of the identified portion of the target object 1007 and generates the shape data of the target object 1007 with an even higher accuracy. In addition, the conversion unit 1024C converts and silhouettes the shape data based on the full length data.

The calculation unit 1024D uses the shape data converted by the conversion unit 1024C to calculate the measurement data for each portion of the user 1005. Herein, the calculation unit 1024D performs the linear combination or the like on the value of each dimension that has been reduced and the weighting factor W1pi optimized for each portion of the target object 1007 to obtain the predetermined value Z1i. The calculation unit 1024D then uses the predetermined value Z1i and the attribute data of the target object 1007 to perform dimensionality reduction and calculate the measurement data for each portion of the target object 1007 based on the value of each dimension that has been reduced.

The product manufacturing apparatus 1030 is a manufacturing apparatus which uses the measurement data calculated using the measurement data calculation apparatus 1020, to manufacture the desired product related to the shape of the target object 1007. It should be noted that the product manufacturing apparatus 1030 can employ any apparatus which can automatically manufacture and machine a product, and can be achieved by, for example, a three-dimensional printer or the like.

(1-5-2) The Operation of the Product Manufacturing System

Figure 5:
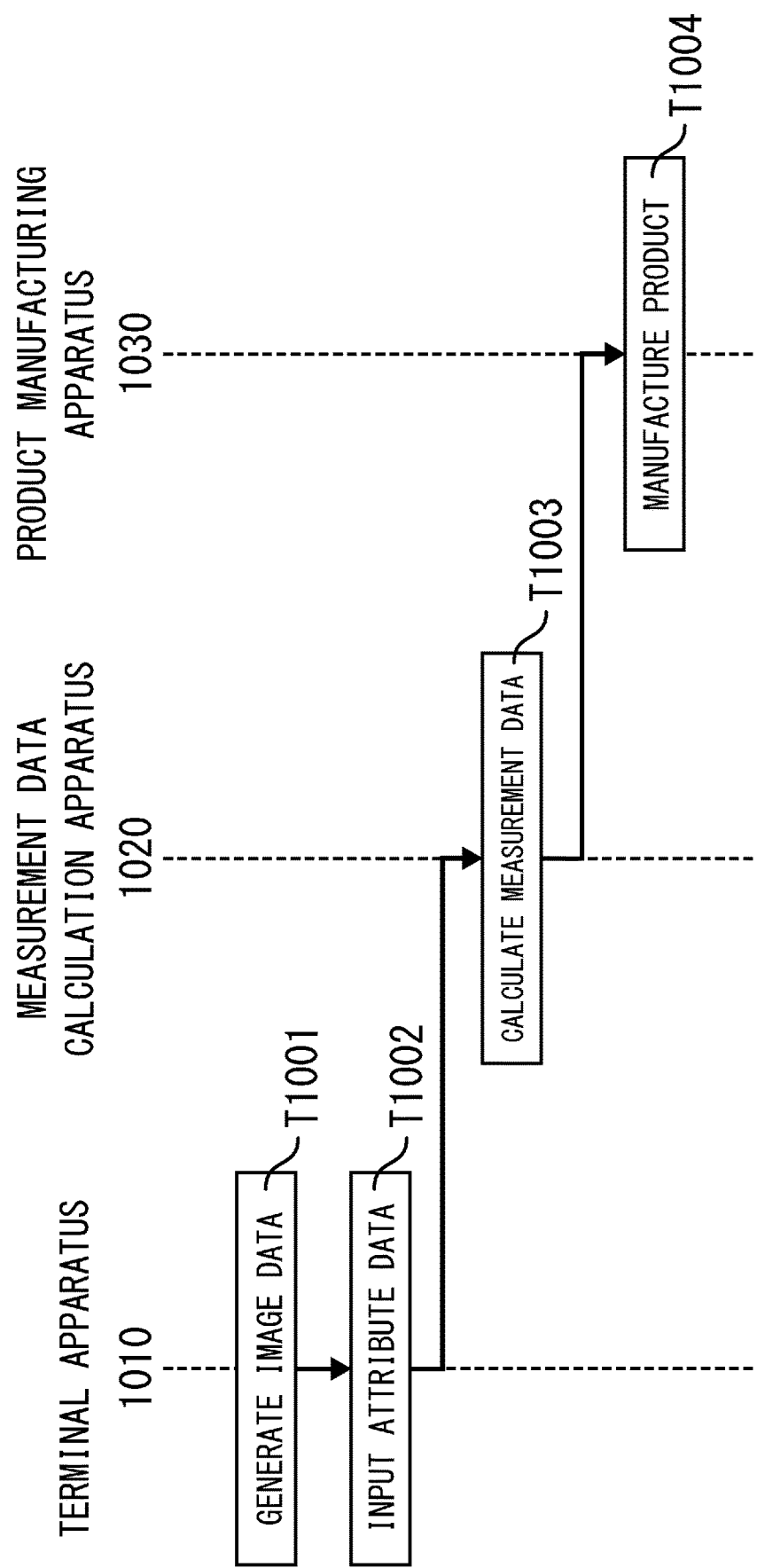
FIG. 5 is a sequence diagram for describing the operation of the product manufacturing system 1001 according to the embodiment.
Figure 6:
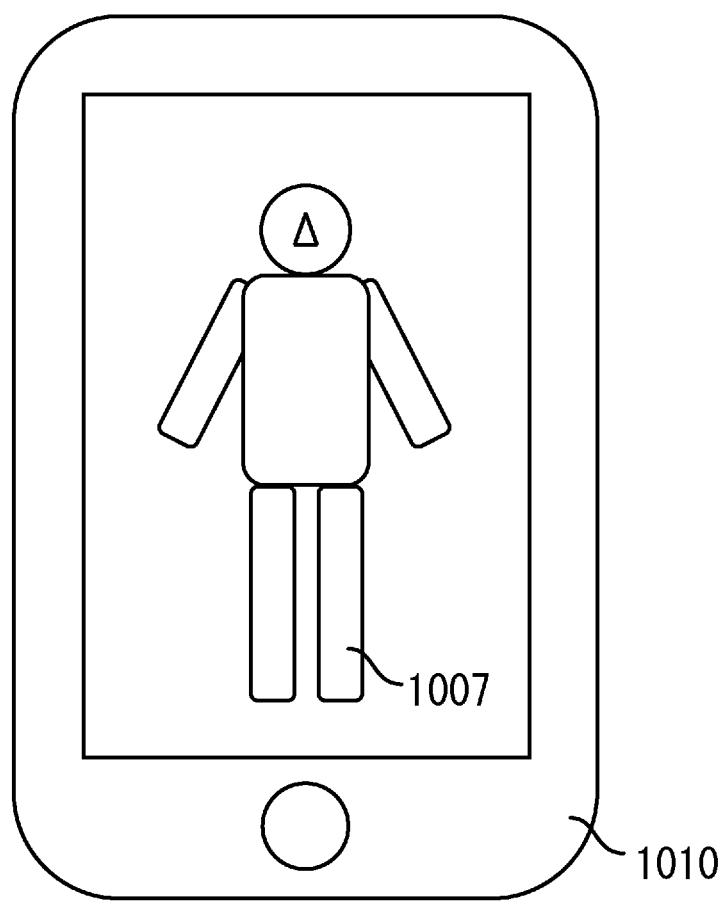
FIG. 6 is a schematic view showing one example of a screen displayed on the terminal apparatus 1010 according to the embodiment.
Figure 7:
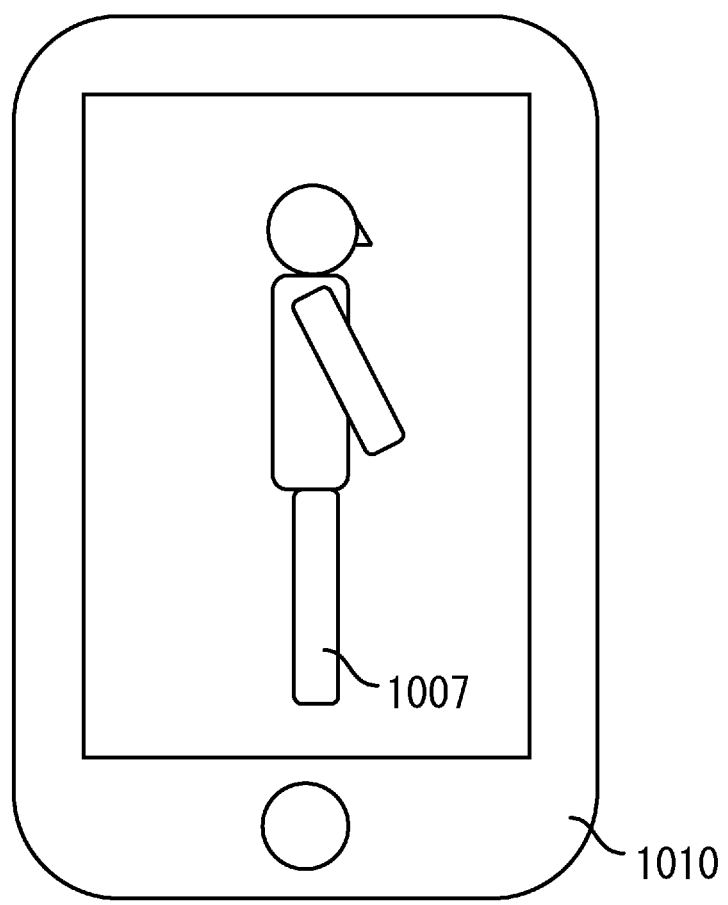
FIG. 7 is a schematic view showing one example of a screen displayed on the terminal apparatus 1010 according to the embodiment.

FIG. 5 is a sequence diagram for describing the operation of the product manufacturing system 1001 according to the present embodiment. In addition, FIG. 6 and FIG. 7 are schematic views showing the screen transition of the terminal apparatus 1010.

At first, the target object 1007 is entirely captured multiple times via the terminal apparatus 1010 such that it is captured in different directions and a plurality of image data in which the target object 1007 is captured is generated (T1001). Herein, as shown in each of FIG. 6 and FIG. 7, a plurality of photographs of the front plane and the side plane is captured.

Then, the attribute data indicating the attribute of the target object 1007 is input into the terminal apparatus 1010 by the user 1005 (T1002). Herein, the full length data, the weight data, the elapsed time data (including the age or the like) or the like of the target object 1007 are input as the attribute data.

Then, the plurality of image data and the attribute data is transmitted from the terminal apparatus 1010 to the measurement data calculation apparatus 1020.

On receiving the plurality of image data and the attribute data from the terminal apparatus 1010, the measurement data calculation apparatus 1020 uses these data to calculate the measurement data for each portion of the target object 1007 (T1003). It should be noted that the measurement data is displayed on the screen of the terminal apparatus 1010 depending on the settings.

Then, the product manufacturing apparatus 1030 manufactures the desired product 1006 based on the measurement data calculated by the measurement data calculation apparatus 1020 (T1004).

(1-5-3) The Characteristics of the Product Manufacturing System

As described above, the product manufacturing system 1001 according to the present embodiment includes a measurement data calculation apparatus 1020 which can communicate with the terminal apparatus 1010 possessed by the user 1005 and the product manufacturing apparatus 1030. The terminal apparatus 1010 (the photographing apparatus) photographs the plurality of images of the target object 1007. The measurement data calculation apparatus 1020 includes an obtaining unit 1024A, an extraction unit 1024B, a conversion unit 1024C, and a calculation unit 1024D. The obtaining unit 1024A obtains the image data of the target object 1007 from the terminal apparatus 1010 together with the full length data of the target object 1007. The extraction unit 1024B extracts the shape data indicating the shape of the target object 1007 from the image data. The conversion unit 1024C converts and silhouettes the shape data based on the full length data. The calculation unit 1024D uses the shape data converted by the conversion unit 1024C to calculate the measurement data for each portion of the target object 1007. The product manufacturing apparatus 1030 uses the measurement data calculated by the calculation unit 1024D to manufacture the product 1006.

Since such an configuration allows the measurement data calculation apparatus 1020 to calculate each portion of the target object 1007 with a high accuracy, a desired product related to the shape of the target object 1007 can be provided.

For example, the product manufacturing system 1001 allows the model of an organ to be manufactured based on the measurement of the shape of various types of organs such as the heart.

In addition, for example, various types of healthcare products or the like can be manufactured based on the measurement of the waist shape of a person.

In addition, for example, based on the shape of a person, the figure product of the person can be manufactured.

In addition, for example, based on the shape of a person, a chair or the like that is adapted to the person can be manufactured.

In addition, for example, based on the shape of a car, a toy car can be manufactured.

In addition, for example, based on any landscape image, a diorama or the like can be manufactured.

It should be noted that the measurement data calculation apparatus 1020 and the product manufacturing apparatus 1030 are described as apparatuses of separate members in the above description, but these may be configured integrally.

Second Embodiment

In the following, the components and functions which have been already described are given substantially the same reference symbols, and the descriptions are omitted.

(2-1) The Configuration of the Measurement Data Calculation Apparatus

Figures 8, 9:
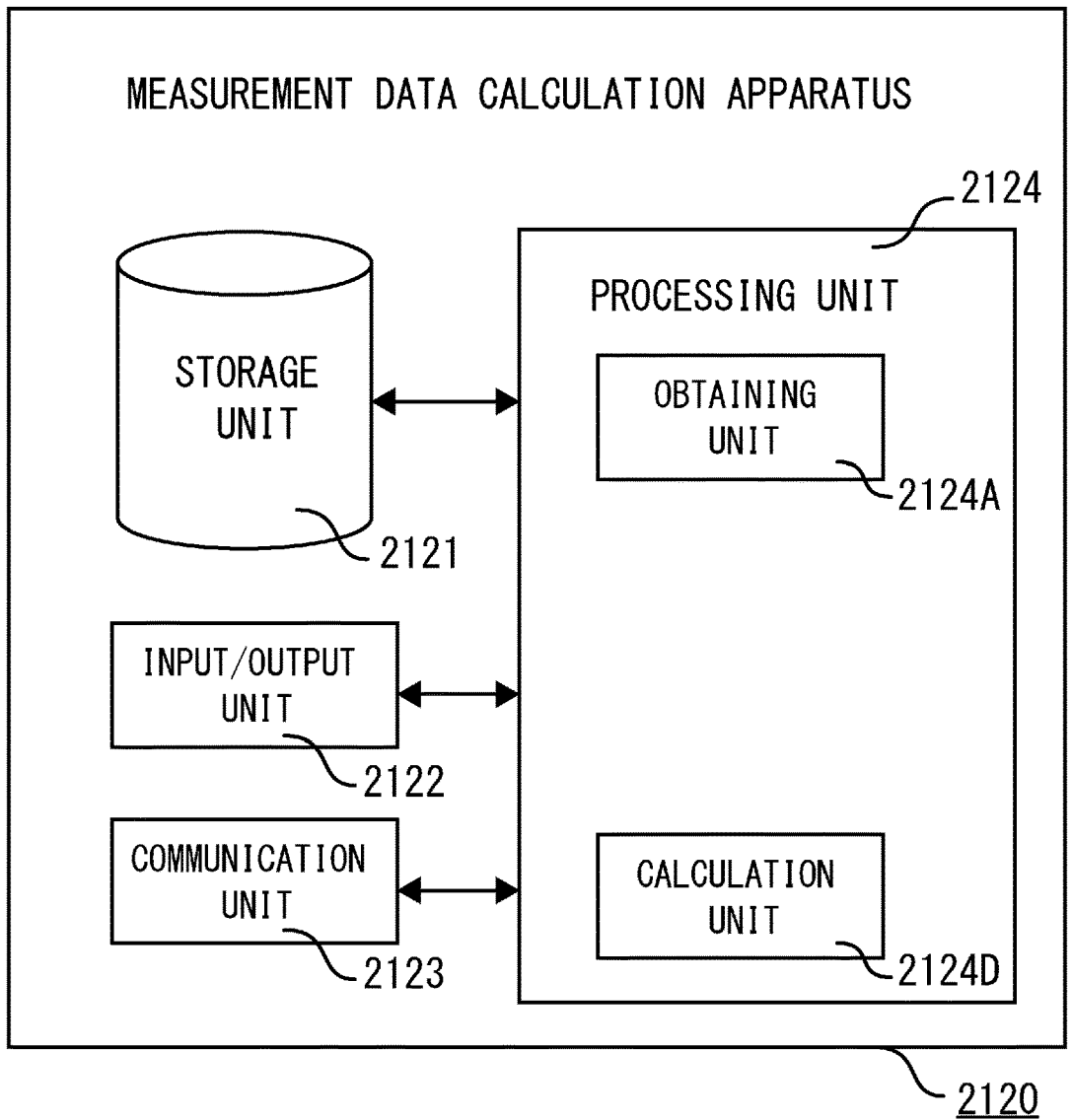
FIG. 8 is a schematic view showing the configuration of a measurement data calculation apparatus 2120 according to a second embodiment.
FIG. 9 is a schematic view showing the concept of the data used for a quadratic regression according to the embodiment.

FIG. 8 is a schematic view showing the configuration of the measurement data calculation apparatus 2120 according to the present embodiment.

The measurement data calculation apparatus 2120 can be achieved by any computer and includes a storage unit 2121, an input/output unit 2122, a communication unit 2123, and a processing unit 2124. It should be noted that the measurement data calculation apparatus 2120 may also be achieved as hardware using an LSI (Large Scale Integration), an ASIC (Application Specific Integrated Circuit), an FPGA (Field-Programmable Gate Array), or the like.

The storage unit 2121 stores various types of information and is achieved by any storage apparatus such as a memory and a hard disk. For example, the storage unit 2121 stores a weighting factor Wri necessary for performing the information processing described later, the weighting factor being associated with the length, weight, and the like of the target object. It should be noted that the weighting factor is obtained in advance by performing machine learning using teacher data including the attribute data and the measurement data which are described later.

The input/output unit 2122 has the components and functions that are similar to or the same as the foregoing input/output unit 1022.

The communication unit 2123 has the components and functions that are similar to or the same as the foregoing communication unit 1023.

The processing unit 2124 performs various types of information processing and is achieved by a processor, such as a CPU or GPU, and a memory. Herein, the program stored in the storage unit 2121 is read by the CPU, GPU, or the like of the computer so that the processing unit 2124 serves as the obtaining unit 2124A and the calculation unit 2124D.

The obtaining unit 2124A obtains the attribute data Dzr (r is the number of elements of the attribute data) including at least any of the full length data, the weight data, and the elapsed time data (including the age or the like) of the target object.

The calculation unit 2124D uses the attribute data obtained by the obtaining unit 2124A to calculate the measurement data for each portion of the target object. Specifically, the calculation unit 2124D uses the weighting factor Wsi obtained through machine learning to perform quadratic regression on the attribute data so as to calculate the measurement data for each portion of the target object. The weighting factor is optimized for each portion of the target object and the weighting factor for the ith portion in the target object is indicated as Wsi. It should be noted that i is greater than or equal to 1 and smaller or equal to j, in which j is the total number of the dimension spot for which the measurement data is to be calculated. In addition, the symbol s is the number of elements used for the operation obtained from the attribute data.

In detail, as shown in FIG. 9, the calculation unit 2124D uses the square value of each element ×1, ×2, and ×3 of the attribute data Dzr (r=3) (being the value on the first row in FIG. 9 and also referred to as the secondary term), the multiplication value of each element (the value on the second row in FIG. 9, also referred to as the interaction term), and the value of each element itself (the valued on the third row in FIG. 9, also referred to as the primary term) to calculate the measurement data. It should be noted that, in the example shown in FIG. 9, since the number of the values obtained from three elements of attribute data ×1, ×2, and ×3 is nine and s=9, the weighting factor Wsi has i×nine elements.

(2-2) The Characteristics of the Measurement Data Calculation Apparatus

As described above, the measurement data calculation apparatus 2120 according to the present embodiment includes an obtaining unit 2124A and a calculation unit 2124D. The obtaining unit 2124A obtains the attribute data including at least any of the full length data, the weight data, and the elapsed time data of the target object. The calculation unit 2124D uses the attribute data to calculate the measurement data for each portion of the target object.

Therefore, since the measurement data calculation apparatus 2120 uses the above described attribute data to calculate the measurement data for each portion of the target object, it can provide the measurement data with a high accuracy. Specifically, the calculation unit 2124D uses the factor obtained through machine learning to perform quadratic regression on the attribute data so as to calculate the measurement data for each portion of the target object with a high accuracy.

In addition, since information processing can be performed on a large number of data at once in the measurement data calculation apparatus 2020, a large number of measurement data can be quickly provided.

In addition, if at least any of the full length data, the weight data, and the elapsed time data is included as the attribute data, the measurement data for each portion of a living thing can be calculated with a high accuracy.

In addition, the measurement data calculation apparatus 2120 is incorporated into the product manufacturing apparatus for manufacturing various types of products so that the product adapted to the shape of the target object can be manufactured.

It should be noted that in the above description the calculation unit 2124D performs quadratic regression on the attribute data to calculate the measurement data for each portion of the target object, but the operation of the calculation unit 2124D is not limited thereto. The calculation unit 2124D may perform linear combination on the attribute data to obtain the measurement data.

(2-3) The Application to the Product Manufacturing System

Figure 10:
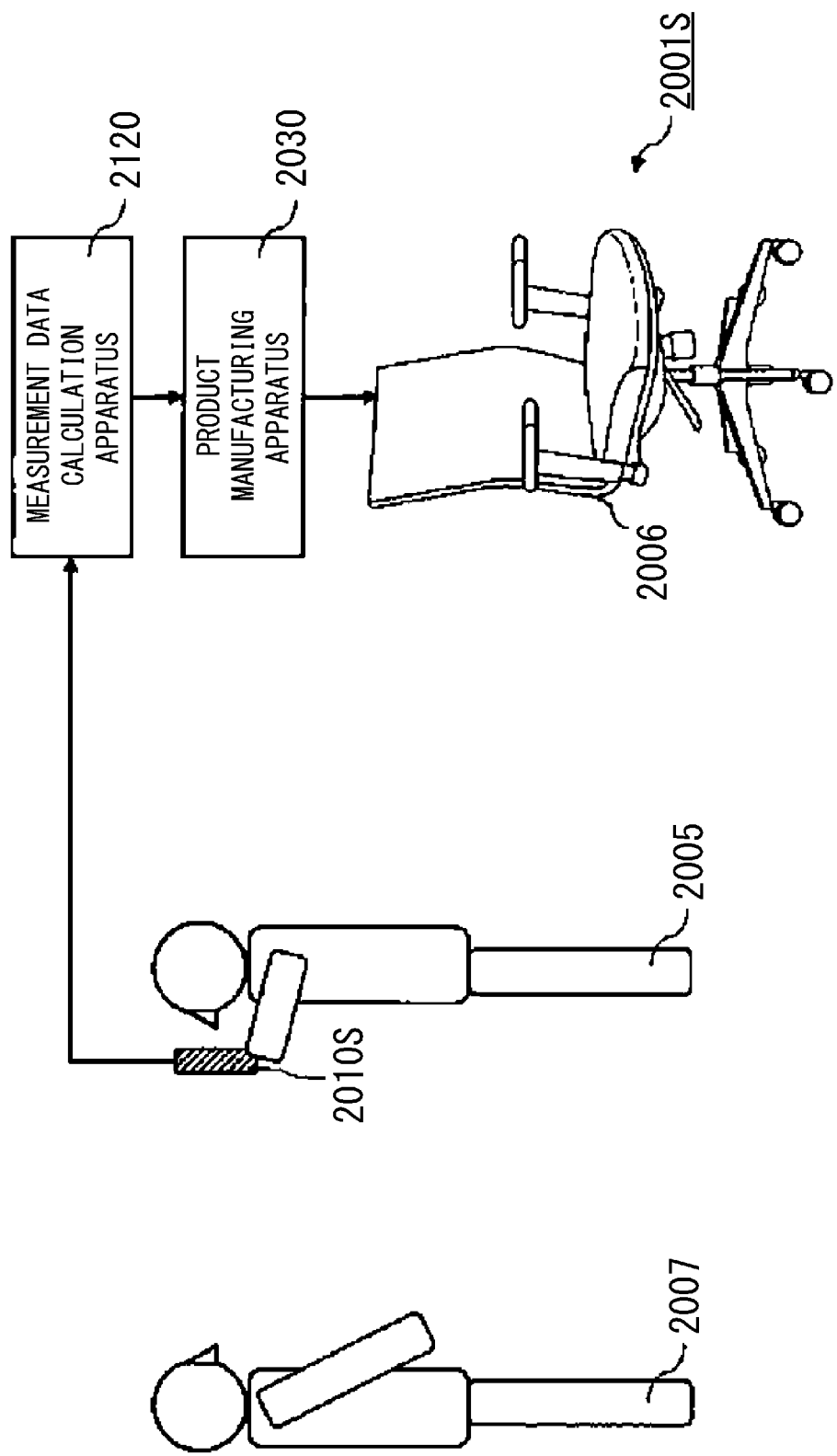
FIG. 10 is a schematic view showing the concept of a product manufacturing system 2001S according to the embodiment.

FIG. 10 is a schematic view showing the concept of the product manufacturing system 2001S according to the present embodiment.

Like the measurement data calculation apparatus 1020 according to the first embodiment, the measurement data calculation apparatus 2120 according to the present embodiment can also be applied to the product manufacturing system 2001S.

The terminal apparatus 2010S according to the present embodiment may be anything as long as it receives the input of the attribute data indicating the attribute of the target object 2007. The "attribute" includes the full length, the weight, the elapsed time since the generation (including the age), and the like of the target object 1007.

In addition, as described above, the processing unit 2124 of the measurement data calculation apparatus 2120 serves as the obtaining unit 2124A and the calculation unit 2124D. The calculation unit 2124D uses the attribute data obtained by the obtaining unit 2124A to calculate the measurement data for each portion of the target object 2007. Specifically, the calculation unit 2124D uses the weighting factor Wsi obtained through machine learning to perform quadratic regression on the attribute data so as to calculate the measurement data for each portion of the target object.

Since in the product manufacturing system 2001S the measurement data calculation apparatus 2120 calculates the each portion for the target object 2007 with a high accuracy, it can provide the desired product related to the shape of the target object 2007. Besides, the product manufacturing system 2001S according to the second embodiment can offer the effects that are similar to or the same as those of the product manufacturing system 1001 of the first embodiment.

Third Embodiment

In the following, the measurement data calculation system according to the embodiment of the information processing apparatus, the information processing method, the product manufacturing apparatus, and the measurement data calculation apparatus of the present invention will be described with reference to the accompanying drawing. In the following description of the embodiment, the information processing apparatus and the measurement data calculation apparatus are implemented as a part of the measurement data calculation system.

In the accompanying drawing, the same or similar reference signs are given to the same or similar elements, and repeated description related to the same or similar elements are omitted in the description of each embodiment in some cases. In addition, the characteristics shown in each embodiment can be applied to another embodiment as long as they do not contradict each other. Furthermore, the drawings are schematic ones and do not necessarily match the actual measurement, ratio, or the like. The parts whose relationships or ratio of the measurements are different among the drawings may be included.

It should be noted that in the following description a plurality of elements indicated altogether using a matrix, vector, or the like may be represented with a capital letter and an individual element in the matrix may be represented with a small letter. For example, the group of shape parameters or the like may be indicated as matrix A and the elements of matrix A may be indicated as element A.

(3-1) The Configuration of the Measurement Data Calculation System

Figure 11:
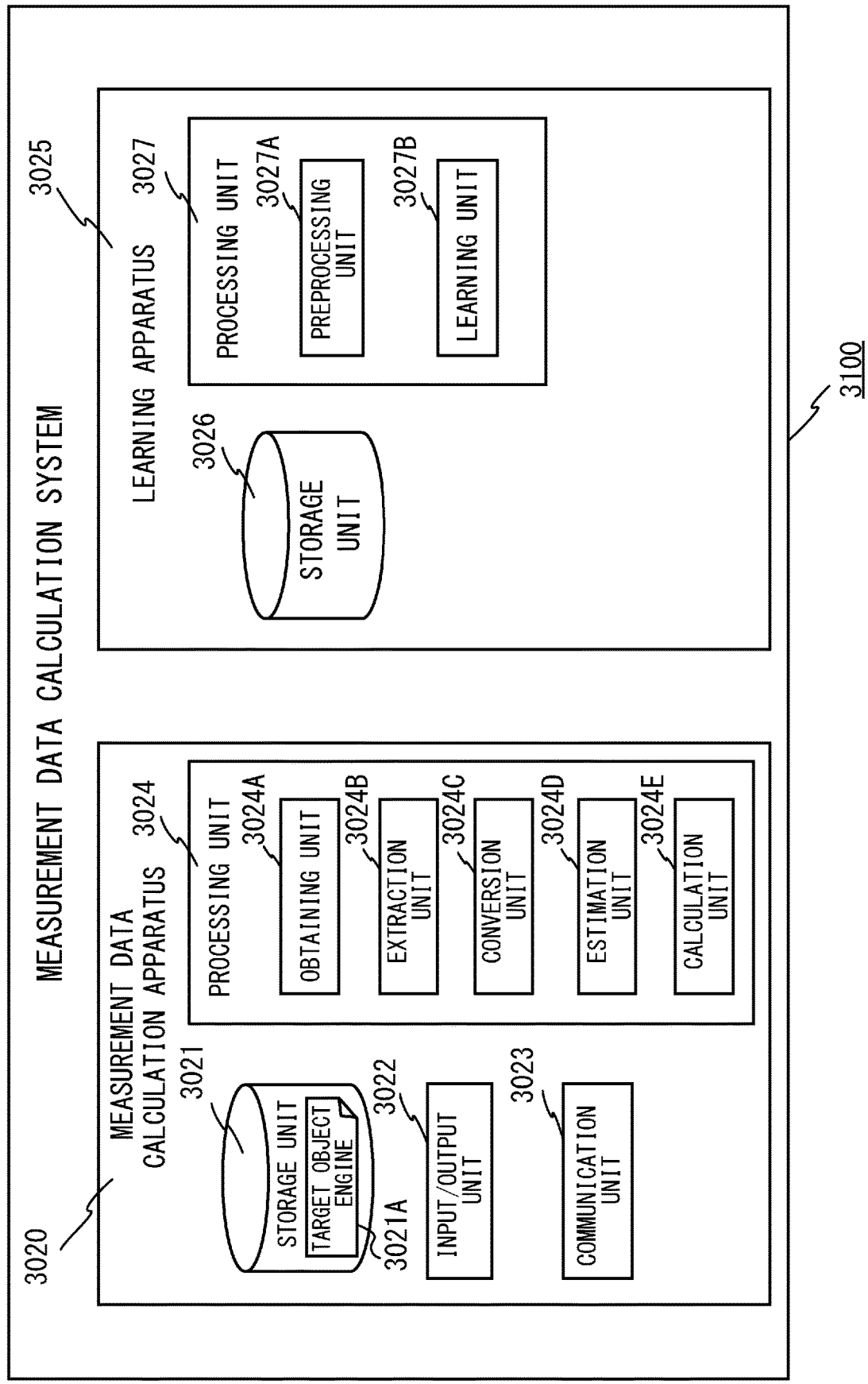
FIG. 11 is a schematic view of a measurement data calculation system 3100 according to a third embodiment.

FIG. 11 is a schematic view showing the configuration of the measurement data calculation system 3100 according to the present embodiment. The measurement data calculation system 3100 includes a measurement data calculation apparatus 3020 and a learning apparatus 3025.

The measurement data calculation apparatus 3020 and the learning apparatus 3025 can be each achieved by any computer. The measurement data calculation apparatus 3020 includes a storage unit 3021, an input/output unit 3022, a communication unit 3023, and a processing unit 3024. In addition, the learning apparatus 3025 includes a storage unit 3026 and a processing unit 3027. It should be noted that the measurement data calculation apparatus 3020 and the learning apparatus 3025 may be achieved as hardware using an LSI (Large Scale Integration), an ASIC (Application Specific Integrated Circuit), an FPGA (Field-Programmable Gate Array), or the like.

Both of the storage units 3021, 3026 store various types of information and are achieved by any storage apparatus such as a memory and a hard disk. For example, the storage unit 3021 stores various types of data, program, information, or the like including the target object engine 3021A for performing information processing related to the measurement data calculation in the processing unit 3024. In addition, to generate the target object engine 3021A, the storage unit 3026 stores the training data utilized in the learning phase.

The input/output unit 3022 is achieved by a keyboard, a mouse, a touch panel, or the like and inputs various types of information to a computer and/or outputs various types of information from the computer.

The communication unit 3023 is achieved by a network interface such as any network card and allows the communication with the communication appliance on the network through a wired or wireless manner.

Both of the processing units 3024 and 3027 are achieved by a processor such as a CPU (Central Processing Unit) and/or a GPU (Graphical Processing Unit) and a memory for performing various types of information processing. The program stored in the storage unit 3021 is read by the CPU, GPU, or the like of the computer so that the processing unit 3024 serves as an obtaining unit 3024A, an extraction unit 3024B, a conversion unit 3024C, an estimation unit 3024D, and a calculation unit 3024E. Likewise, the program stored in the storage unit 3026 is read by the CPU, GPU, or the like of the computer so that the processing unit 3027 serves as a preprocessing unit 3027A and a learning unit 3027B.

In the processing unit 3024 of the measurement data calculation apparatus 3020, the obtaining unit 3024A obtains the image data in which the target object is photographed, and the attribute data, such as the full length data and the weight data, of the target object. The obtaining unit 3024A obtains, for example, the plurality of image data in which the image capture apparatus photographs the target object in a plurality of different directions.

The extraction unit 3024B extracts the shape data indicating the shape of the target object from the image data. Specifically, the extraction unit 3024B uses an algorithm of semantic segmentation, such as Mask R-CNN, prepared for each type of a target object to extract the target object area included in the image data so as to extract the shape data of the target object. The algorithm of the semantic segmentation can be built using training data for which the shape of the target object is not identified.

It should be noted that if the algorithm of the semantic segmentation has been built using the training data of the target object whose shape is not identified the shape of the target object cannot be necessarily extracted with a high accuracy. In such a case, the extraction unit 3024B extracts the shape data of the target object from the target object area using the GrabCut algorithm. This allows the shape of the target object to be extracted with a high accuracy.

In addition, the extraction unit 3024B may correct the image of the target object identified by the GrabCut algorithm based on the color image of the identified portion of the target object to separate the target object from the background image other than the target object. This can generate the shape data of the target object with an even higher accuracy.

The conversion unit 3024C silhouettes the shape data based on the full length data. In other words, it converts the shape data of the target object and generates the silhouette image of the target object. In this way, the shape data is normalized. The conversion unit 3024C serves as a reception unit for inputting the generated silhouette image into the estimation unit 3024D.

The estimation unit 3024D estimates the values of the predetermined quantity of the shape parameters based on the silhouette image. The target object engine 3021A is used for the estimation. The values of the predetermined quantity of the shape parameters of target objects estimated by the estimation unit 3024D are associated with the measurement data related to any region of the target object.

The calculation unit 3024E calculates the measurement data of the target object associated with the values of the predetermined quantity of shape parameters estimated by the estimation unit 3024D based on the value. Specifically, the calculation unit 3024E constructs the three-dimensional data of a plurality of vertexes in the target object from the value of the shape parameter of the target object estimated by the estimation unit 3024D and further calculates the measurement data between any two vertexes in the target object based on the three-dimensional data.

In the processing unit 3027 of the learning apparatus 3025, the preprocessing unit 3027A implements various types of preprocessing for learning. Particularly, the preprocessing unit 3027A identifies the predetermined quantity of the shape parameters by performing the feature extraction on the three-dimensional data of the sample target object through dimensionality reduction. In addition, the values of the predetermined quantity (dimension) of the shape parameters are obtained for each sample target object. The values of the shape parameter of the sample target object are stored in the storage unit 3026 as training data.

In addition, the preprocessing unit 3027A virtually constructs the three-dimensional object of the sample target object within the three-dimensional space based on the three-dimensional data of the sample target object and then uses an image capture apparatus virtually provided within the three-dimensional space to project the three-dimensional object in a predetermined direction to generate the silhouette image of the sample target object. The data of the generated silhouette image of the sample target object is stored in the storage unit 3026 as training data.

The learning unit 3027B learns to associate the relationship between the silhouette image of the sample target object and the values of the predetermined quantity of the shape parameters associated with the sample target object. As the result of the learning, the target object engine 3021A is generated. The generated target object engine 3021A can be held in the form of an electronic file. When the measurement data of the target object is calculated in the measurement data calculation apparatus 3020, the target object engine 3021A is stored in the storage unit 3021 and referred to by the estimation unit 3024D.

(3-2) The Operation of the Measurement Data Calculation System

Figure 12:
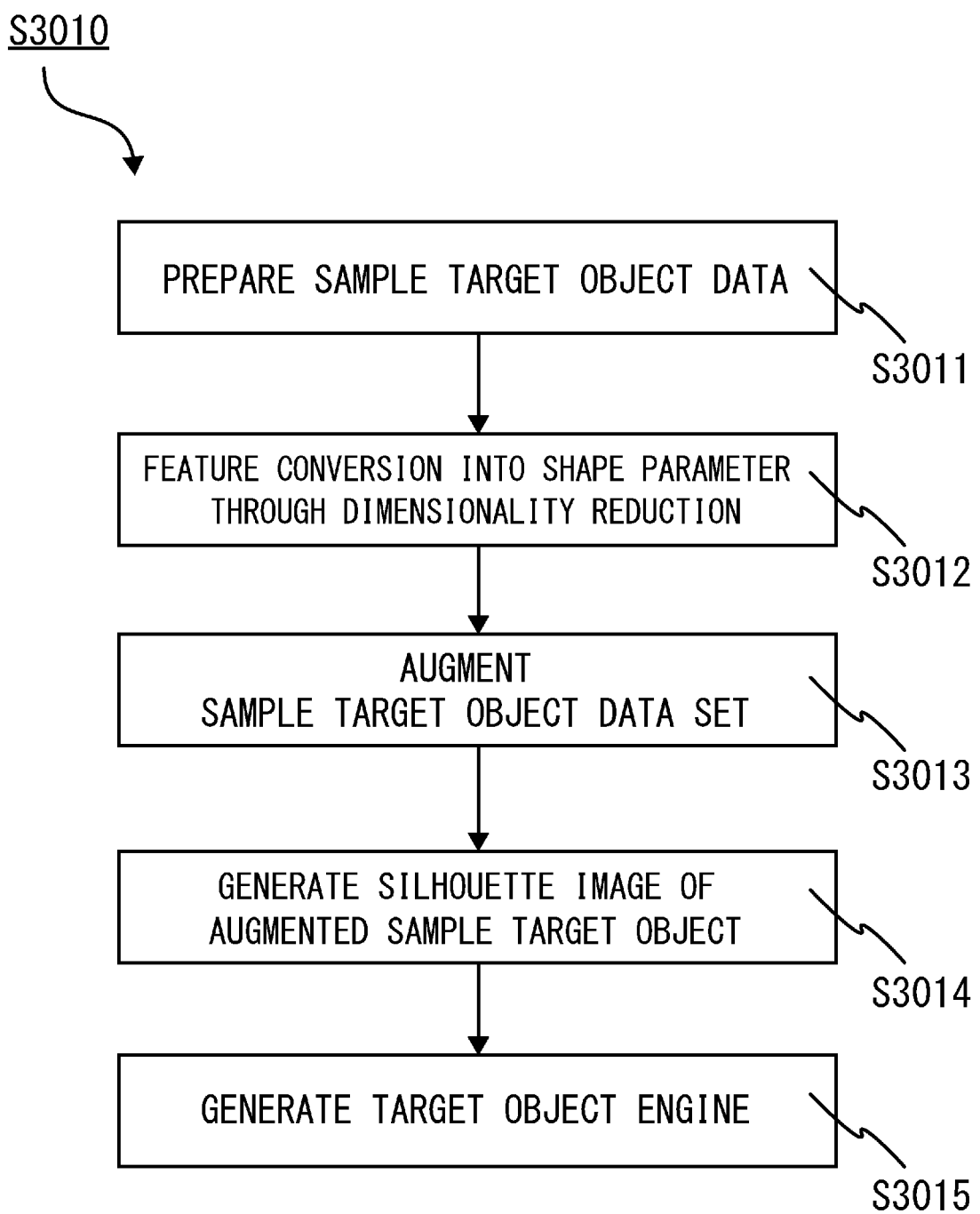
FIG. 12 is a flowchart showing the operation of a learning apparatus 3025 in FIG. 11.

The operation of the measurement data calculation system 3100 in FIG. 11 will be described with reference to FIG. 12 and FIG. 13. FIG. 12 is a flowchart showing the operation of the learning apparatus 3025 (S3010), in which the target object engine 3021A is generated based on the sample target object data. FIG. 13 is a flowchart showing the operation of the measurement data calculation apparatus 3020, in which the measurement data of the target object is calculated based on the image data of the target object.

(3-2-1) The Operation of the Learning Apparatus

At first, the data of the sample target object is prepared and stored in the storage unit 3026 (S3011). In one example, the data to be prepared is the data of 400 sample target objects and includes 5,000 three-dimensional data for each sample target object. The three-dimensional data includes the three-dimensional coordinate data of the vertexes included in the sample target object. In addition, the three-dimensional data may include the vertex information of each mesh constituting the three-dimensional object and the mesh data of each vertex such as the normal direction, as well as the attribute data such as the full length data, the weight data, and the elapsed time data (including the age or the like).

The three-dimensional data of the sample target object is associated with vertex numbers. In the foregoing example, the three-dimensional data of 5,000 vertexes is associated with vertex numbers #1 to #5,000 for each sample target object. In addition, all or a part of the vertex numbers are associated with the information for the region of the target object. For example, if the target object is "a person", the vertex number #20 is associated with "the head vertex" and likewise, the vertex number #313 is associated with "the acromion of the left shoulder" and the vertex number #521 is associated with "the acromion of the right shoulder", and so on.

The preprocessing unit 3027A subsequently performs the feature conversion into the shape parameter through dimensionality reduction (S3012). Specifically, it performs feature extraction on the three-dimensional data of the sample target object through the dimensionality reduction for each sample target object. As the result, the predetermined quantity (the number of dimensions) of the shape parameters are obtained. In one example, the number of dimensions of the shape parameters is 30. The dimensionality reduction is achieved through the approach such as principal component analysis, Random Projection, or the like.

The preprocessing unit 3027A uses the projection matrix of the principal component analysis to convert the three-dimensional data into the value of the predetermined quantity of the shape parameter for each sample target object. In this way, while the related characteristic information is maintained, noise can be eliminated from the three-dimensional data of the sample target object and the three-dimensional data can be compressed.

As in the foregoing example, it is assumed that there are 400 data of the sample target object and each sample target object includes the three-dimensional (coordinate) data of the 5,000 vertexes and performs feature conversion on each of the three-dimensional data into 30 dimensions of the shape parameters. Herein, the vertex coordinate matrix of [400 rows, 15,000 (5,000×3) columns] representing the data of 400 sample target objects is indicated as matrix X. In addition, the projection matrix of [15,000 rows, 30 columns] generated through the principal component analysis is indicated as matrix W. By multiplying the vertex coordinate matrix X by the projection matrix W from the right, matrix Λ which is the shape parameter matrix of [400 rows, 30 columns] can be obtained.

In other words, the shape parameter matrix Λ can be calculated using the following equation.

$$\begin{pmatrix} x_{1,1} & \cdots & x_{1,15000} \\ \vdots & \ddots & \vdots \\ x_{400,1} & \cdots & x_{400,15000} \end{pmatrix} \begin{pmatrix} w_{1,1} & \cdots & w_{1,30} \\ \vdots & \ddots & \vdots \\ x_{15000,1} & \cdots & x_{15000,30} \end{pmatrix} =$$

$$\begin{pmatrix} \lambda_{1,1} & \cdots & \lambda_{1,30} \\ \vdots & \ddots & \vdots \\ \lambda_{400,1} & \cdots & \lambda_{400,30} \end{pmatrix}$$

As the result of the matrix operation using the projection matrix W, the feature conversion is performed on 15,000 dimensions of data included in each of 400 sample target objects, which is converted into 30 dimensions of shape parameters of the principal component ($\lambda_1, \ldots, \lambda_{30}$). It should be noted that, in the principal component analysis, the calculation is performed such that the average value of 400 values ($\lambda_{1,1}, \ldots, \lambda_{400,1}$) for $\lambda_1$, is zero.

As the result of S3012, after the shape parameter matrix Λ is obtained, the preprocessing unit 3027A uses a random number to augment the data set of the shape parameter included in the shape parameter matrix Λ (S3013). In the foregoing example, the data augmentation is performed on the 400 data set ($\lambda_{i,1}, \ldots, \lambda_{i,30}$, in which 1≤i≤400), which is augmented into the augmented data set of 10,000 shape parameters ($\lambda_{j,1}, \ldots, \lambda_{j,30}$, in which 1≤j≤10,000). The data augmentation is performed using the random numbers with the normal distribution. The augmented data set is in the normal distribution in which the variance of the value of each shape parameter is 30.

The inverse transformation based on the projection matrix W is performed on the augmented data set so that the three-dimensional data of the augmented data set can be constructed. Furthermore, in the foregoing example, the augmented shape parameter matrix of [10,000 rows, 30 columns] representing 10,000 augmented data set is indicated as matrix Λ' ($\lambda_{j,k}, \ldots, \lambda_{j,k}$, in which 1≤j≤10,000 and 1≤k≤30). The vertex coordinate matrix X' representing the three-dimensional data of 10,000 sample target objects is obtained by multiplying the augmented shape parameter matrix Λ' by the transposed matrix $W^T$ of the projection matrix W of [30 rows, 15,000 columns] from right.

In other words, the vertex coordinate matrix X' can be calculated from the following equation and, for each sample target object augmented into 10,000 sample target objects, 5,000 (15,000/3) three-dimensional data can be obtained.

$$\begin{pmatrix} \lambda'_{1,1} & \cdots & \lambda'_{1,30} \\ \vdots & \ddots & \vdots \\ \lambda'_{10000,1} & \cdots & \lambda'_{10000,30} \end{pmatrix} \begin{pmatrix} w_{1,1} & \cdots & w_{1,30} \\ \vdots & \ddots & \vdots \\ x_{15000,1} & \cdots & x_{15000,30} \end{pmatrix}^T =$$
$$\begin{pmatrix} x'_{1,1} & \cdots & x'_{1,15000} \\ \vdots & \ddots & \vdots \\ x'_{10000,1} & \cdots & x'_{10000,15000} \end{pmatrix}$$

As the result of S3013, after the vertex coordinate matrix X' is obtained, the preprocessing unit 3027A generates each silhouette image based on the three-dimensional data of the augmented sample target object (S3014). In the foregoing example, for each of 10,000 sample target objects, the three-dimensional object of the sample target object is virtually constructed from 5,000 three-dimensional data in the three-dimensional space. Then, the three-dimensional object is projected using a projection apparatus which is also virtually provided in the three-dimensional space and can project in any direction. In the foregoing example, for each of 10,000 sample target objects, two silhouette images of the front plane direction and the side surface direction may be obtained through projection. The obtained silhouette image is represented with binarized data of black and white.

Finally, through learning, the learning unit 3027B associates the relationship between the value of the shape parameter associated with the sample target object and the silhouette image of the sample target object (S3015). Specifically, it may use, for the training data, the pair of the data set of the shape parameter obtained in S3013 and the silhouette image obtained in S3014 to learn the both relationship through deep learning.

In more detail, for the sample target object augmented into 10,000 in the foregoing example, the binarized data of each silhouette image is input into the network architecture of deep learning. In the feature extraction of deep learning, the weighting factor of the network architecture is set such that the data which is output from the network architecture is close to the values of 30 shape parameters. It should be noted that, for the deep learning herein, in one example, Convolutional Neural Network (CNN) can be utilized.

In this way, in S3014, the relationship between the value of the shape parameter associated with the sample target object and the silhouette image of the sample target object is learned through deep learning and the network architecture of deep learning is built. As the result, in response to the silhouette image of the target object being input, the target object engine 3021A, which is the estimation model for estimating the value of the shape parameter is generated.

(3-2-2) The Operation of the Measurement Data Calculation Apparatus

The measurement data calculation apparatus 3020 stores the electronic file of the target object engine 3021A generated by the learning apparatus 3025 and the projection information of the principal component analysis obtained by the learning apparatus 3025 into the storage unit 3021 in advance for use in the measurement data calculation of the target object.

At first, the obtaining unit 3024A obtains, through the input/output unit 3122, a plurality of image data in which the entire target object is photographed in different directions via an external terminal apparatus or the like, as well as the full length data indicating the full length of the target object (S3021). Then, the extraction unit 3024B extracts each of the shape data indicating the shape of each portion of the target object from each image data (S3022). The conversion unit 3024C subsequently performs the rescale process which converts each shape data into a predetermined size based on the full length data (S3023). Through the steps of S3021 to S3023, the silhouette image of the target object is generated and the measurement data calculation apparatus 3020 receives the silhouette image of the target object.

The estimation unit 3024D subsequently uses the target object engine 3021A stored in the storage unit 3021 in advance to estimate the value of the shape parameter of the target object from the received silhouette image (S3024). The calculation unit 3024E then calculates the measurement data related to the region included in the target object based on the value of the shape parameter of the target object (S3025).

Specifically, in the calculation of the measurement data in S3025, the three-dimensional data of the vertexes of the target object is first constructed from the values of the predetermined quantity of the shape parameters estimated by the target object engine 3021A for the target object. Herein, the inverse transformation of the projection according to the dimensionality reduction implemented in the preprocessing unit 3027A during the learning phase (S3010) may be performed. In more detail, by multiplying the estimated value of the predetermined quantity of the shape parameter (column vector) by transposed matrix WT of projection matrix W according to the principal component analysis from right, the three-dimensional data can be obtained.

In the foregoing example, for the value Λ" of the shape parameter of the target object, the three-dimensional data X" of the target object can be calculated through the following equation.

$$(\lambda''_1 \cdots \lambda''_{30}) \begin{pmatrix} w_{1,1} & \cdots & w_{1,30} \\ \vdots & \ddots & \vdots \\ x_{15000,1} & \cdots & x_{15000,30} \end{pmatrix}^T = (x''_{1,1} \cdots x''_{1,15000})$$

In S3025, the calculation unit 3024E uses the three-dimensional data to calculate the measurement data between any two vertexes in the target object. Herein, the three-dimensional object is virtually constructed from the three-dimensional data and the measurement data between the two vertexes along the curved surface on the three-dimensional object is calculated. In other words, the distance between the two vertexes can be stereoscopically calculated along the stereoscopic shape of the three-dimensional object. In order to stereoscopically calculate the distance between the two vertexes, at first, the shortest path connecting the two vertexes on the three-dimensional mesh constituted of a large number of vertexes (5,000 three-dimensional data in the foregoing example) is explored and the mesh through which the shortest path passes is identified. Then, the vertex coordinate data of the identified mesh is used to calculate and total the distance for each mesh along the shortest path. The total value is the stereoscopic distance between two vertexes. It should be noted that the vertex information for each mesh constituting the three-dimensional object and the mesh data of each vertex such as the normal direction can be used for the calculation of the stereoscopic distance.

For example, a case is assumed in which the target object is "a person" and "the shoulder width" of the person is to be calculated. As an advance preparation, it is predefined that "the shoulder width is the distance between the vertex indicating the acromion of the left shoulder and the vertex indicating the acromion of the right shoulder". In addition, it is associated in advance that the vertex number of the vertex indicating the acromion of the left shoulder is, for example, #313 and the vertex number of the vertex indicating the acromion of the right shoulder is, for example, #521. Such information is stored in the storage unit 3021 in advance. During the measurement data calculation, the shortest path from the vertex number #313 toward the vertex number #521 may be identified, and the vertex coordinate data of the mesh identified with reference to the shortest path may be used to calculate and total the distance for each mesh along the shortest path.

In this way, the measurement data calculation apparatus 3020 according to the present embodiment can use the target object engine 3021A to estimate the value of the predetermined quantity of the shape parameters from the silhouette image with a high accuracy. In addition, since the three-dimensional data of the target object can be reconstructed with a high accuracy from the value of the shape parameter estimated with a high accuracy, not only the identified site but also the interval between any two vertexes can be calculated with a high accuracy as a measurement target spot. In particular, the measurement data between the two vertexes to be calculated has a high accuracy because it is calculated along the stereoscopic shape based on the three-dimensional object constructed from the three-dimensional data.

(3-3) The Characteristics of the Measurement Data Calculation System a) As described above, the measurement data calculation system 3100 according to the present embodiment includes the measurement data calculation apparatus 3020 and the learning apparatus 3025. The information processing apparatus configured as a part of the measurement data calculation apparatus 3020 includes a conversion unit (a reception unit) 3024C and an estimation unit 3024D. The conversion unit (a reception unit) 3024C receives the silhouette image of the target object. The estimation unit 3024D uses a target object engine 3021A which associates the silhouette image of a sample target object with the values of the predetermined quantity of the shape parameters associated with the sample target object to estimate the value of the shape parameter of the target object from the received silhouette image. Then, the value of the shape parameter of the estimated target object is associated with the measurement data related to any region included in the target object.

In addition, the measurement data calculation apparatus 3020 includes an obtaining unit 3024A, an extraction unit 3024B, a conversion unit 3024C, an estimation unit 3024D, and a calculation unit 3024E. The obtaining unit 3024A obtains the image data in which the target object is photographed and the full length data of the target object. The extraction unit 3024B extracts the shape data indicating the shape of the target object from the image data. The conversion unit 3024C converts the shape data into the silhouette image based on the full length data. The estimation unit 3024D uses the target object engine 3021A which associates the silhouette image of the sample target object with the values of the predetermined quantity of the shape parameters associated with the sample target object to estimate the value of the predetermined quantity of the shape parameters from the silhouette image. The calculation unit 3024E calculates the measurement data of the target object based on the estimated values of the predetermined quantity of the shape parameters.

Therefore, the measurement data calculation apparatus 3020 can use the target object engine 3021A that is created in advance to estimate the value of the predetermined quantity of shape parameters from the silhouette image with a high accuracy. In addition, the value of the shape parameter that is estimated with a high accuracy is used so that the data related to any region of the target object can be efficiently calculated with a high accuracy. In this way, according to the measurement data calculation apparatus 3020, the measurement data calculated for the target object can be efficiently provided with a high accuracy..

The measurement data calculation apparatus 3020 is used so that, for example, the measurement data of each portion of a living thing as a target object can be calculated with a high accuracy. In addition, the measurement data of each portion of any object, such as a car or various types of cargos, as a target object can be calculated with a high accuracy. Furthermore, the measurement data calculation apparatus 3020 is incorporated into the product manufacturing apparatus for manufacturing various types of products so that the product adapted to the shape of the target object can be manufactured.

The measurement data calculation apparatus 3020 is used so that, for example, the measurement data related to each region of a living thing as a target object can be calculated with a high accuracy. In addition, the measurement data of each portion of any object, such as a car or various types of cargos, as a target object can be calculated with a high accuracy. In addition, the measurement data calculation apparatus 3020 is incorporated into the product manufacturing apparatus for manufacturing various types of products so that the product adapted to the shape of the target object can be manufactured.

b) In the measurement data calculation apparatus 3020, the predetermined quantity of shape parameters associated with the sample target object are identified through the dimensionality reduction of the three-dimensional data of the sample target object. The dimensionality reduction is particularly performed through the principal component analysis. In this way, the noise can be effectively eliminated from the three-dimensional data of the sample target object and the three-dimensional data can be compressed.

c) In the measurement data calculation apparatus 3020, for the estimated values of the predetermined quantity of shape parameters, the three-dimensional data of the target object is calculated through the inverse transformation of the projection according to the above described principal component analysis and the three-dimensional data is associated with the measurement data. In this way, for the input of the silhouette image of the target object, the three-dimensional data of the target object can be constructed with a high accuracy.

d) In the measurement data calculation apparatus 3020, the silhouette image of the sample target object is the projection image of the predetermined direction in the three-dimensional object constructed from the three-dimensional data of the sample target object. In other words, the three-dimensional object is constructed using the three-dimensional data of the sample target object and is projected to obtain the silhouette image. Two silhouette images of the front plane direction and the side surface direction may be obtained through projection. In this way, the silhouette image of the sample target object can be generated with a high accuracy.

e) In the measurement data calculation apparatus 3020, the target object engine 3021A is generated by learning the relationship between the silhouette image of the sample target object and the values of the predetermined quantity of shape parameters associated with the sample target object. The learning can be performed through deep learning. The learning through deep learning is performed so that the silhouette image of the sample target object and the value of the shape parameter of the sample target object can be associated with a high accuracy.

f) In the calculation unit 3024E of the measurement data calculation apparatus 3020, the three-dimensional data of a plurality of vertexes in the target object is constructed from the values of the predetermined quantity of shape parameters estimated for the target object. Then, based on the constructed three-dimensional data, the measurement data between any two vertexes in the target object is calculated. In other words, the three-dimensional object is constructed using the three-dimensional data of the target object and then the measurement data thereof is calculated. In this way, since the measurement data between two vertexes can be calculated from the shape of the three-dimensional object of the target object, the measurement target spot is not limited to the identified portion.

In particular, in the calculation unit 3024E of the measurement data calculation apparatus 3020, the measurement data between the two vertexes is calculated along the curved surface on the three-dimensional object constructed from the three-dimensional data of a plurality of vertexes in the target object. Thus, the measurement data can be calculated with an even higher accuracy.

(3-4) Variation (3-4-1) In the above description, the obtaining unit 3024A obtains the plurality of image data in which the target object is photographed in different directions. Herein, as the image capture apparatus that can photograph the target object in a plurality of different directions at the same time, the depth data measurement apparatus that can also obtain the depth data can be applied. One example of the depth data measurement apparatus is a stereo camera. In this specification, the "stereo camera" means the image capture apparatus in any form that photographs the target object in a plurality of different directions at the same time and reproduces the binocular disparity. On the other hand, a plurality of image data is not necessarily required but one image data of the target object can calculate the measurement data of each portion.

If the foregoing stereo camera is applied as the depth data measurement apparatus, the image data that can be obtained by the obtaining unit 3024A can be RGB-D (Red, Green, Blue, Depth) data. Specifically, the image data can include a depth map having depth data for each pixel based on the depth data, in addition to the RGB image data that can be obtained by a typical monocular camera.

(3-4-2) In the above description, the semantic segmentation algorithm or the GrabCut algorithm may be employed to extract the shape data of the target object and separate the target object from the background image other than target object. Additionally or alternatively, for example, if the stereo camera is used, the depth map obtained from the stereo camera may be used to obtain the shape data of the target object which is associated with the depth data of the target object, and separate the background image. This can generate the shape data of the target object with an even higher accuracy.

Specifically, if the stereo camera is used, the extraction unit 3024B may extract, from the image data in which the target object is photographed, the target object area that is the portion in which the target object is captured, based on the depth map obtained by the obtaining unit 3024A. For example, the regions in which the depth data is not in a predetermined range are eliminated from the depth map so that the target object area is extracted. In the extracted target object area, the shape data is associated with the depth data of the target object for each pixel.

As described later, the conversion unit 3024C also converts the shape data into new shape data based on the depth data of the target object area in addition to the foregoing full length data to generate a "gradation silhouette image".

The gradation silhouette image to be generated is not a mere binarized data of black and white but is a monochrome image with single color multiple gradation in which for example the luminance value is represented with the data from 0 (black) to 1 (white) based on the depth data. In other words, the gradation silhouette image data is associated with the depth data and has even more amount of information about the shape of the target object.

If the gradation silhouette image is used, the process in the processing unit 3027 of the learning apparatus 3025 may be implemented in the following manner. It should be noted that the gradation silhouette image data is normalized with the full length data.

In the preprocessing unit 3027A, when the image capture apparatus virtually provided within the three-dimensional space is used to project the three-dimensional object of the sample target object from a predetermined direction, the depth data from the image capture apparatus to the sample target object may also be obtained. In other words, the silhouette image data of the sample target object is associated with the depth data. Based on the depth data, the gradation silhouette image of the sample target object to be generated is, for example, a monochrome image with single color multiple gradation having the luminance value from 0 (black) to 1 (white), and has even more amount of information related to the shape of the sample target object.

When the target object engine 3021A is generated in the learning unit 3027B, the learning may be performed such that the values of the predetermined quantity of the shape parameters related to the sample target object are associated with the gradation silhouette image of the sample target object associated with the depth data. In other words, since in the learning apparatus 3025 the learning process based on the depth data of the sample target object is performed based on even more amount of information, the target object engine 3021A can be generate with an even higher accuracy.

According to this variation, the target object area is extracted based on the depth map constructed using as the obtaining unit 3024A any machine which can measure the depth data so that the shape data of the target object can be generated with an even higher accuracy. In addition, the gradation silhouette image data (the shape data to be converted) is associated with the depth data of the target object. In addition, the target object engine 3021A is also generated as the result of the learning process based on the depth data. Therefore, it is possible to have even more amount of information related to the shape of the target object and calculate the measurement data for each portion of the target object by the calculation unit 3024E with an even higher accuracy.

Furthermore, besides the stereo camera, a LiDAR (Light Detection and Ranging) apparatus can be used to obtain the depth data and separate the target object from the background image other than the target object. In other words, any machine that can measure the depth data (the depth data measurement apparatus) is used for the obtaining unit 3024A so that the shape data of the target object can be generated with a high accuracy.

It should be noted that the gradation silhouette image has been distinguished from a mere silhouette image in the above description, but in another embodiment and another variation the both may not be distinguished but described as a mere silhouette image.

(3-4-3) In the above description, in S3013, the preprocessing unit 3027A performs the data augmentation process in which random numbers are used to augment the data set of the shape parameter. Depending on the number of the sample target objects, the data augmentation process may determine the number to which the data set is augmented. If an enough number of samples are prepared in advance, the augmentation process in S3013 needs not to be performed.

(3-4-4) In the above description, for a sample target object, the shape parameter $(\lambda_1, \ldots, \lambda_{30})$ is obtained through the principal component analysis in the preprocessing unit 3027A of the learning apparatus 3025. Herein, the shape parameter in a case where the sample target object is "a person" is further discussed. As a result of a principal component analysis performed using the three-dimensional data of 400 sample target objects and 5,000 vertexes as in the foregoing example, it is discussed that the shape parameter in a case where the target object is "a person" has at least the following characteristics.

Characteristic 1

The principal component $\lambda_1$ of the first order is associated such that it has a linear relationship with the height of a person. Specifically, as shown in FIG. 14, the height of the person decreases as the principal component $\lambda_1$ of the first order increases.

In consideration of characteristic 1, when the value of the shape parameter of a person is estimated by the estimation unit 3024D, the height data obtained by the obtaining unit 3024A may be utilized for the principal component $\lambda_1$ of the first order without using the target object engine 3021A. Specifically, the value of the principal component $\lambda_1$ of the first order may be configured to be calculated separately by utilizing the linear regression model in which the explanatory variable is the height of the person.

In this case, when the target object engine 3021A is generated in the learning unit 3027B during the learning phase, the principal component $\lambda 1$ may be removed from the learning target. As described above, during the learning phase in the learning apparatus 3025, the weighting of the network architecture is performed. At this time, the weighting factor of the network architecture may be set such that the error is minimized between the principal component of the second and subsequent orders from which the principal component of the first order is removed and that is obtained through the principal component analysis of the input silhouette image and the values of the shape parameter $\lambda 2$ and the subsequent shape parameters which are the training data. In this way, if the target object is "a person", the estimation accuracy for the value of the shape parameter in the estimation unit 3024D can be improved in conjunction with the utilization of the above described linear regression model.

In addition, when the target object engine 3021A is generated in the learning unit 3027B during the learning phase, the weighting factor of the network architecture may be set such that the error is minimized between the principal component, including that of the first order, and the values of the shape parameter $\lambda 1$ and the subsequent shape parameters. Then, the value of the principal component $\lambda 1$ of the first order may also be replaced with the value calculated separately by utilizing the linear regression model in which the explanatory variable is the height of a person. In this way, if the target object is "a person", the estimation accuracy of a value of the shape parameter in the estimation unit 3024D can be improved in conjunction with the utilization of the above described linear regression model.

Characteristics 2

Figure 15:
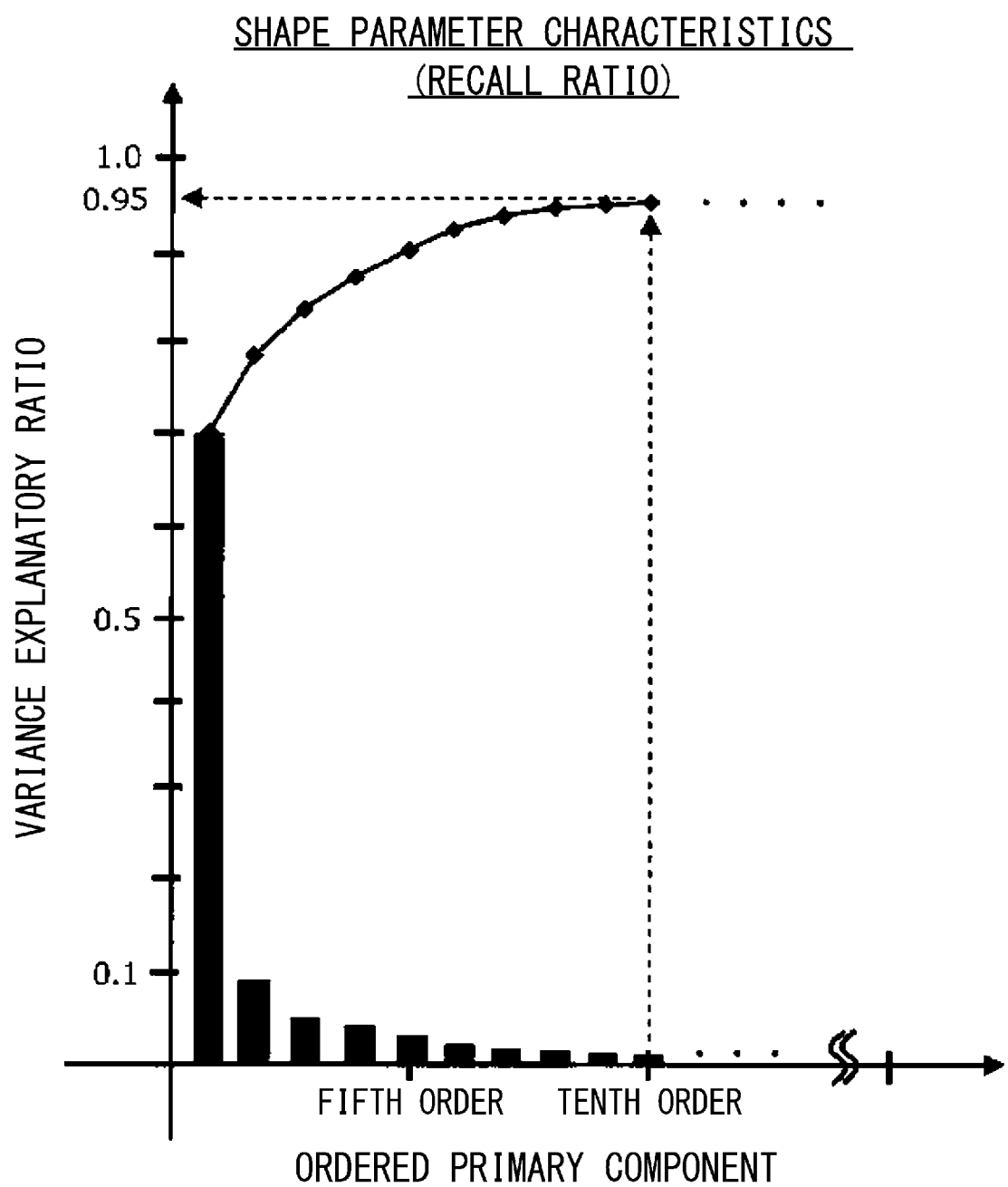
FIG. 15 is a schematic graph showing the characteristics of the shape parameter.

FIG. 15 is a schematic graph showing the recall ratio of the shape parameter which is the principal component. In the graph, the horizontal axis indicates the principal component given orders according to the contribution ratio and the vertical axis indicates the variance explanatory ratio of eigenvalue. Also, the bar graph indicates the individual variance explanatory ratio for each order. Also, the solid line graph indicates the cumulative variance explanatory ratio from the first order. For simplicity, FIG. 15 schematically shows the graph related to 10 principal components from the first order to the tenth order. It should be noted that the eigenvalue of the covariance matrix obtained in the principal component analysis represents the magnitude of the eigenvector (the principal component) and the variance explanatory ratio of the eigenvalue can be regarded as the recall ratio for the principal component.

With reference to the graph in FIG. 15, for the 10 principal components from the first order to the tenth order, the cumulative variance explanatory ratio is about 0.95 (the dashed line arrow). In other words, a person skilled in the art would understand that the recall ratio of the 10 principal components from the first order to the tenth order is about 95%. In other words, the shape parameter that is subject to the feature conversion through the dimensionality reduction is described as 30 dimensions in the foregoing example but is not limited thereto. Even 10 dimensions of the shape parameter would be able to cover about 95%. In other words, although the quantity (the number of dimensions) of the shape parameter is 30 in the above description, it may be about 10 in consideration of the characteristics 2.

(3-4-5) In the above description, in the preprocessing unit 3027A of the learning apparatus 3025, two silhouette images of the front plane direction and the side surface direction are obtained through projection for each of 10,000 sample target objects. On the other hand, the required quantity of the silhouette image of the target object is not necessarily two, but may also be one.

(3-5) The Application to the Product Manufacturing System

In the following, the example is described in which the foregoing measurement data calculation apparatus 3020 is applied to the product manufacturing system 3001.

(3-5-1) The Configuration of the Product Manufacturing System

Figure 16:
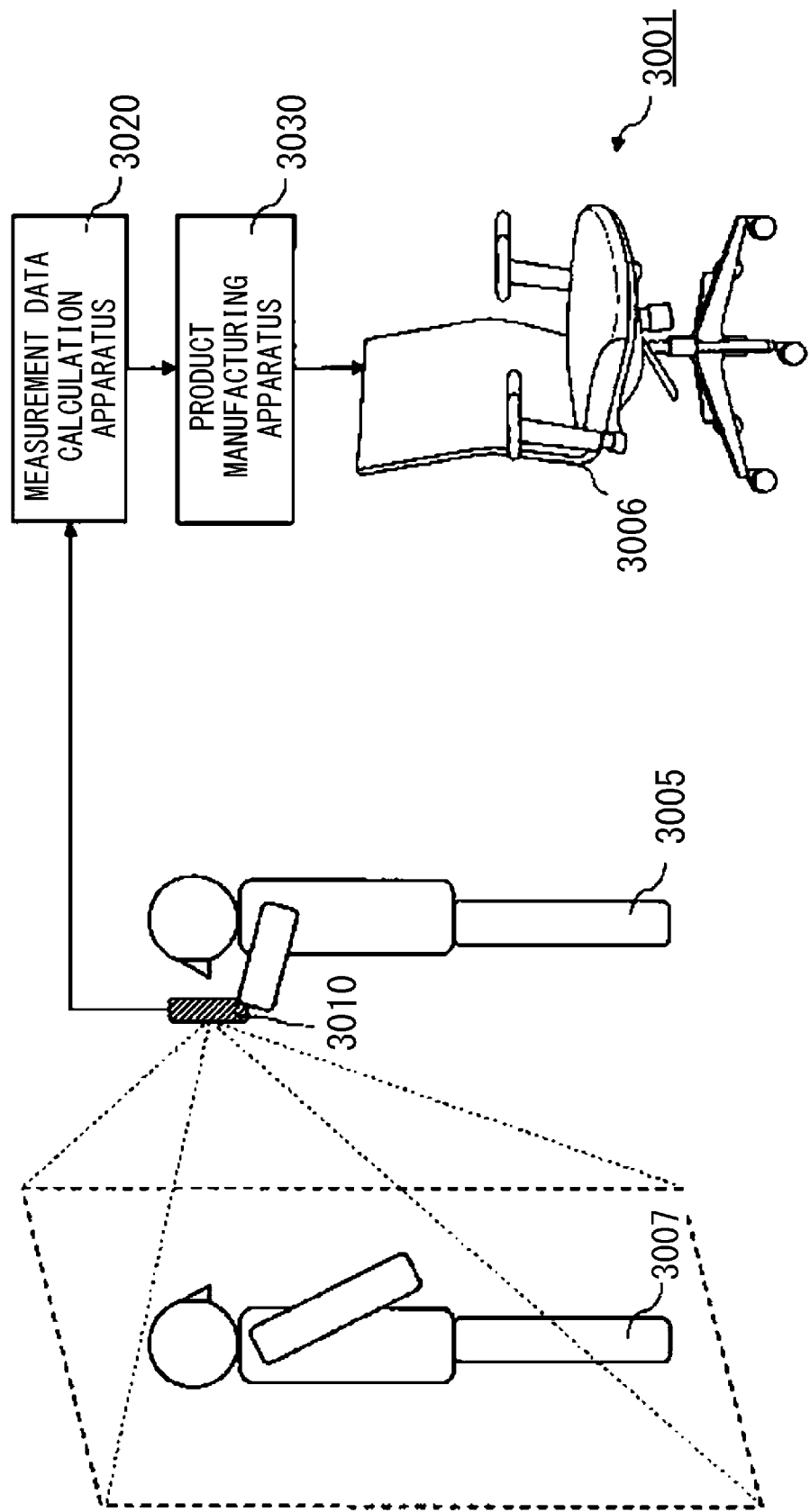
FIG. 16 is a schematic view showing the concept of a product manufacturing system 3001 according to the third embodiment.

FIG. 16 is a schematic view showing the concept of the product manufacturing system 3001 according to the present embodiment. The product manufacturing system 3001 is a system that includes a measurement data calculation apparatus 3020 that can communicate with the terminal apparatus 3010 possessed by the user 3005, and a product manufacturing apparatus 3030, and that is configured to manufacture the desired product 3006. FIG. 16 shows a concept in which the target object 3007 is a person and the product 3006 is a chair, as one example. However, in the product manufacturing system 3001 according to the present embodiment, the target object 3007 and the product 3006 are not limited thereto.

The terminal apparatus 3010 can be achieved by a so-called smart device. Herein, the program for a user is installed on the smart device so that the terminal apparatus 3010 can offer various types of functions. Specifically, the terminal apparatus 3010 generates the image data captured by the user 3005. Herein, the terminal apparatus 3010 may have a stereo camera function which photographs the target object in a plurality of different directions at the same time to reproduce the binocular disparity. It should be noted that the image data is not limited to those photographed by the terminal apparatus 3010 but, for example, those photographed using the stereo camera installed in a store may be utilized.

In addition, the terminal apparatus 3010 receives the input of the attribute data indicating the attribute of the target object 3007. The "attribute" includes the full length, the weight, the elapsed time from generation (including the age), and the like of the target object 3007. In addition, the terminal apparatus 3010 has a communication function, and performs transmission and reception of various types of information between each of the measurement data calculation apparatus 3020 and the product manufacturing apparatus 3030 and the terminal apparatus 3010.

The measurement data calculation apparatus 3020 can be achieved by any computer. Herein, the storage unit 3021 of the measurement data calculation apparatus 3020 stores the information transmitted from the terminal apparatus 3010, which is associated with the identification information that identifies the user 3005 of the terminal apparatus 3010. In addition, the storage unit 3021 stores the parameter or the like necessary for performing the information processing in which the measurement data is calculated.

In addition, the processing unit 3024 of the measurement data calculation apparatus 3020 serves as the obtaining unit 3024A, the extraction unit 3024B, the conversion unit 3024C, the estimation unit 3024D, and the calculation unit 3024E, as described above. Herein, the obtaining unit 3024A obtains the image data that is photographed by the user 3005 with a stereo camera and the attribute data of the target object 3007. In addition, the extraction unit 3024B extracts the shape data indicating the shape of the target object 3007 from the image data. For example, if "a person" is preset as the type of the target object, the algorithm of semantic segmentation is built using the training data for identifying the person. In addition, the extraction unit 3024B may use the depth map that is based on the depth data obtained by the stereo camera to separate the target object from the background image other than the target object. In this case, the conversion unit 3024C converts the shape data associated with the depth data of the target object in the depth map to the gradation silhouette image based on the full length data. The generated gradation silhouette image may be a monochrome image with a single color multiple gradation based on the depth data. The conversion unit 3024C also serves as a reception unit that inputs the generated silhouette image into the estimation unit 3024D.

The estimation unit 3024D uses the target object engine 3021A which associates the silhouette image of the sample target object with the values of the predetermined quantity of the shape parameters associated with the sample target object to estimate the value of the predetermined quantity of the shape parameters from the silhouette image. The calculation unit 3024E calculates the measurement data of the target object based on the estimated values of the predetermined quantity of the shape parameters. Specifically, it constructs the three-dimensional data of a plurality of vertexes in the target object from the value of the shape parameter of the target object estimated by the estimation unit 3024D and further calculates the measurement data between any two vertexes in the target object based on the three-dimensional data.

The product manufacturing apparatus 3030 is a manufacturing apparatus that uses at least one measurement data calculated using the measurement data calculation apparatus 3020, to manufacture the desired product related to the shape of the target object 3007. It should be noted that the product manufacturing apparatus 3030 can employ any apparatus which can automatically manufacture and machine a product and can be achieved by, for example, a three-dimensional printer or the like.

(3-5-2) The Operation of the Product Manufacturing System

Figure 17:
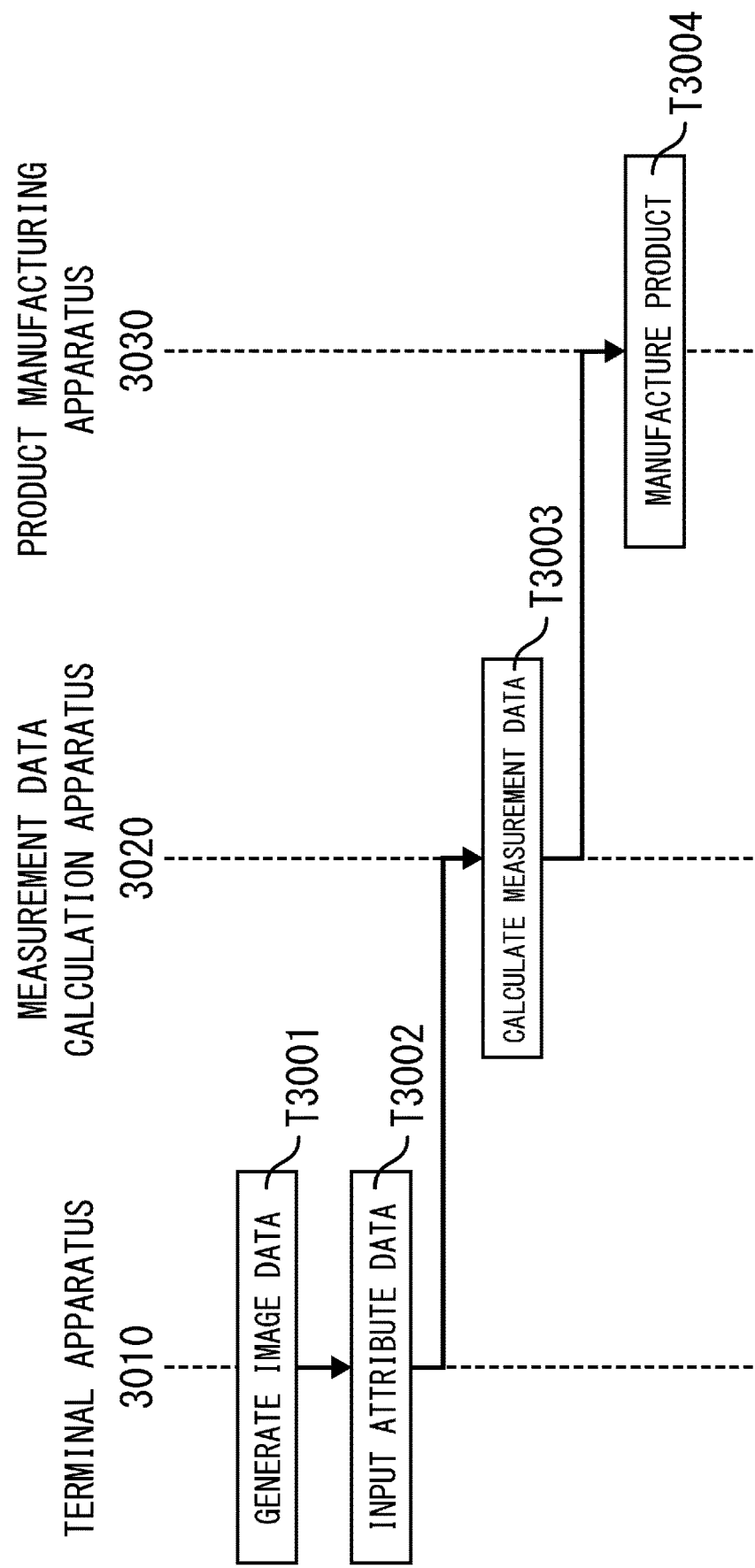
FIG. 17 is a sequence diagram showing the operation of the product manufacturing system 3001 in FIG. 16.
Figure 18:
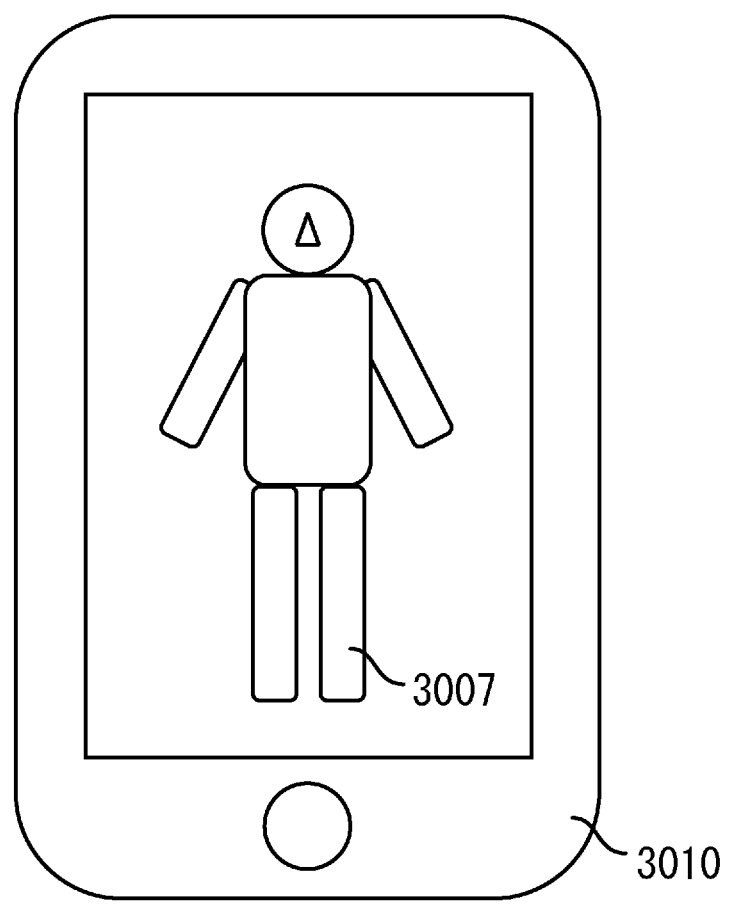
FIG. 18 is a schematic view showing one example of the screen displayed on the terminal apparatus 3010 in FIG. 16.
Figure 19:
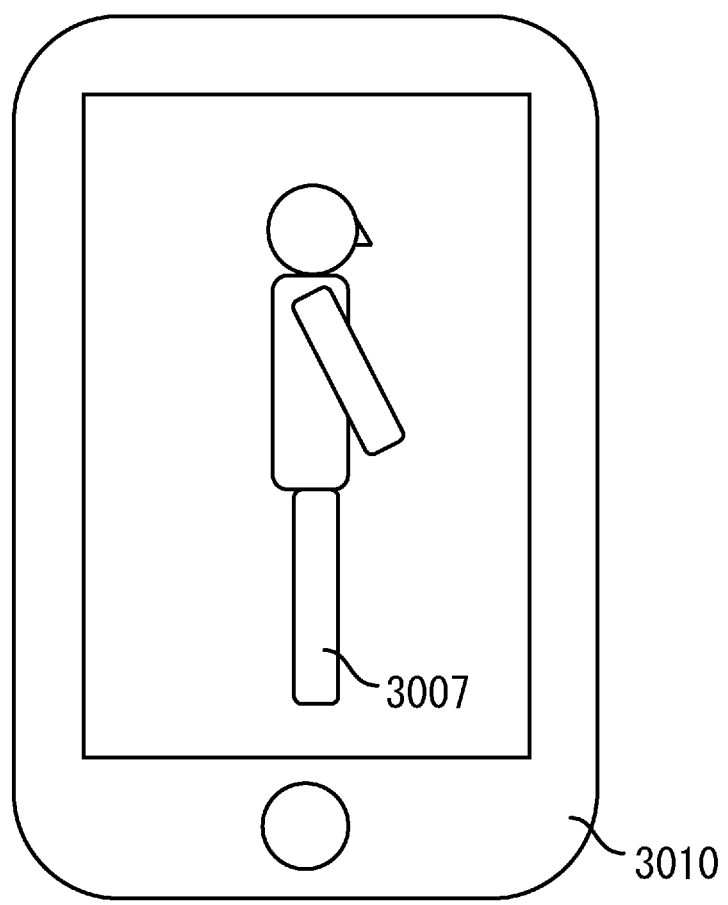
FIG. 19 is a schematic view showing one example of a screen displayed on terminal apparatus 3010 in FIG. 16.

FIG. 17 is a sequence diagram for describing the operation of the product manufacturing system 3001 according to the present embodiment. In addition, FIG. 18 and FIG. 19 are the schematic views showing the screen transition of the terminal apparatus 3010.

At first, the target object 3007 is entirely captured multiple times such that it is captured in different directions via the terminal apparatus 3010 and a plurality of image data in which the target object 3007 is captured is generated (T3001). Herein, as shown in each of FIG. 18 and FIG. 19, a plurality of photographs of the front plane and the side plane is captured. Such front plane and side plane photographs may be photographed with the stereo camera function of the terminal apparatus 3010 turned on.

Then, the attribute data indicating the attribute of the target object 3007 is input into the terminal apparatus 3010 by the user 3005 (T3002). Herein, the full length data, the weight data, the elapsed time data (including the age or the like) or the like of the target object 3007 are input as the attribute data.

Then, the plurality of image data and the attribute data are transmitted from the terminal apparatus 3010 to the measurement data calculation apparatus 3020.

On receiving the plurality of image data and the attribute data from the terminal apparatus 3010, the measurement data calculation apparatus 3020 uses these data to calculate the measurement data for each portion of the target object 3007 (T3003). It should be noted that the measurement data is displayed on the screen of the terminal apparatus 3010 depending on the settings. Then, the product manufacturing apparatus 3030 manufactures the desired product 3006 based on the measurement data calculated by the measurement data calculation apparatus 3020 (T3004).

(3-5-3) The Characteristic of the Product Manufacturing System

As described above, the product manufacturing system 3001 according to the present embodiment includes a measurement data calculation apparatus 3020 which can communicate with the terminal apparatus 3010 possessed by the user 3005 and the product manufacturing apparatus 3030.

The terminal apparatus 3010 (the photographing apparatus) photographs a plurality of images of the target object 3007.

The measurement data calculation apparatus 3020 includes an obtaining unit 3024A, an extraction unit 3024B, a conversion unit 3024C, an estimation unit 3024D, and a calculation unit 3024E. The obtaining unit 3024A obtains the image data in which the target object is photographed and the full length data of the target object. The extraction unit 3024B extracts the shape data indicating the shape of the target object from the image data. The conversion unit 3024C converts the shape data into the silhouette image based on the full length data. The estimation unit 3024D uses the target object engine 3021A which associates the silhouette image of the sample target object with the values of the predetermined quantity of the shape parameters associated with the sample target object to estimate the value of the predetermined quantity of the shape parameters from the silhouette image. The calculation unit 3024E calculates the measurement data of the target object based on the estimated values of the predetermined quantity of the shape parameters. The product manufacturing apparatus 3030 uses the measurement data calculated by the calculation unit 3024E to manufacture the product 3006. Since such a configuration allows the measurement data calculation apparatus 3020 to calculate the each portion of the target object 3007 with a high accuracy, a desired product related to the shape of the target object 3007 can be provided.

For example, the product manufacturing system 3001 allows the model of an organ to be manufactured based on the measurement of the shape of various types of organs such as the heart. In addition, for example, various types of healthcare products or the like can be manufactured based on the measurement of the waist shape of a person. In addition, for example, based on the shape of a person, the figure product of the person can be manufactured. In addition, for example, based on the shape of a person, a chair or the like that is adapted to the person can be manufactured. In addition, for example, based on the shape of a car, a toy car can be manufactured. In addition, for example, based on any landscape image, a diorama or the like can be manufactured.

It should be noted that the measurement data calculation apparatus 3020 and the product manufacturing apparatus 3030 are described as apparatuses of separate members in the above description, but these may be configured integrally.

Fourth Embodiment

In the following, substantially the same reference symbols are given to the components and functions which have been already described, and the descriptions are omitted.

(4-1) The Configuration of the Measurement Data Calculation Apparatus

Figure 20:
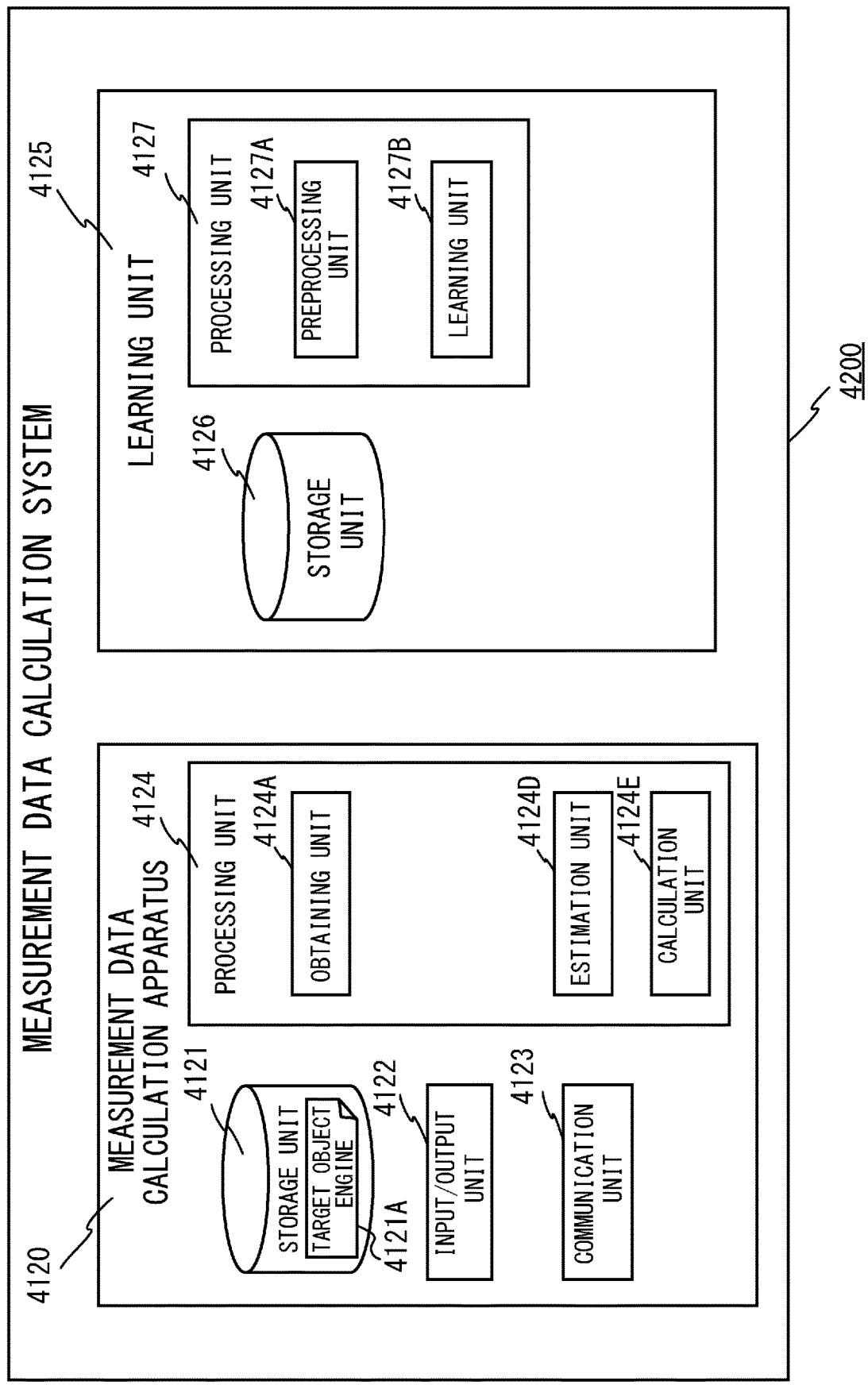
FIG. 20 is a schematic view of a measurement data calculation system 4100 according to a fourth embodiment.

FIG. 20 is a schematic view showing the configuration of the measurement data calculation system 4200 according to the present embodiment. The measurement data calculation system 4200 includes a measurement data calculation apparatus 4120 and a learning apparatus 4125.

The measurement data calculation apparatus 4120 includes a storage unit 4121, an input/output unit 4122, a communication unit 4123, and a processing unit 4124. In addition, the learning apparatus 4125 includes a storage unit 4126 and a processing unit 4127. It should be noted that the measurement data calculation apparatus 4120 and the learning apparatus 4125 may be achieved as hardware using an LSI, an ASIC, an FPGA, or the like.

Both of the storage units 4121, 4126 store various types of information and are achieved by any storage apparatus such as a memory and a hard disk. For example, the storage unit 4121 stores various types of data, program, information, or the like including the target object engine 4121A for performing information processing related to the measurement data calculation in the processing unit 4124. In addition, to generate the target object engine 4121A, the storage unit 4126 stores the training data utilized in the learning phase.

The input/output unit 4122 has the components and functions that are similar to or the same as the foregoing input/output unit 3022.

In addition, the communication unit 4123 has the components and functions that are similar to or the same as the foregoing communication unit 3023.

The program stored in the storage unit 4121 is read by the CPU, GPU, or the like of a computer so that the processing unit 4124 serves as an obtaining unit 4124A, an estimation unit 4124D, and a calculation unit 4124E. Likewise, the program stored in the storage unit 4126 is read by the CPU, GPU, or the like of the computer so that the processing unit 4127 serves as a preprocessing unit 4127A and a learning unit 4127B.

In the processing unit 4124 of the measurement data calculation apparatus 4120, the obtaining unit 4124A obtains the attribute data including at least any of the full length data, the weight data, the elapsed time data (including the age or the like) of the target object. In the present embodiment, the obtaining unit 4124A also serves as a reception unit used to input the attribute data into the estimation unit 4124D.

The estimation unit 4124D estimates the value of a predetermined quantity of the shape parameter based on the attribute data. The target object engine 4121A is used for the estimation. The values of the shape parameters of the target object estimated by the estimation unit 4124D can be associated with the measurement data related to any region included in the target object, as described later.

The calculation unit 4124E calculates the measurement data of the target object from the value of the shape parameter of the target object estimated by the estimation unit 4124D. Specifically, the calculation unit 4124E constructs the three-dimensional data of a plurality of vertexes in the target object from the value of the shape parameter of the target object estimated by the estimation unit 4124D and further calculates the measurement data between any two vertexes in the target object based on the three-dimensional data.

In the processing unit 4127 of the learning apparatus 4125, the preprocessing unit 4127A implements various types of preprocessing for learning. In particular, the preprocessing unit 4127A identifies the predetermined quantity of the shape parameters by performing the feature extraction on the three-dimensional data of the sample target object through dimensionality reduction. The value of the shape parameter of the sample target object and the corresponding attribute data are stored in the storage unit 4126 in advance as the training data.

It should be noted that the corresponding attribute data, that is, the full length data, the weight data, and the elapsed time data (including the age or the like) is assumed to be prepared as the three-dimensional data of the sample target object. The corresponding attribute data is stored in the storage unit 4126 as the training data.

The learning unit 4127B learns such that the relationship between the value of the shape parameter of the sample target object and the corresponding attribute data is associated. As the result of the learning, the target object engine 4121A is generated. The generated target object engine 4121A can be held in the form of an electronic file. When the measurement data of the target object is calculated in the measurement data calculation apparatus 4120, the target object engine 4121A is stored in the storage unit 4121 and referred to by the estimation unit 4124D.

(4-2) The Operation of the Measurement Data Calculation System

Figure 21:
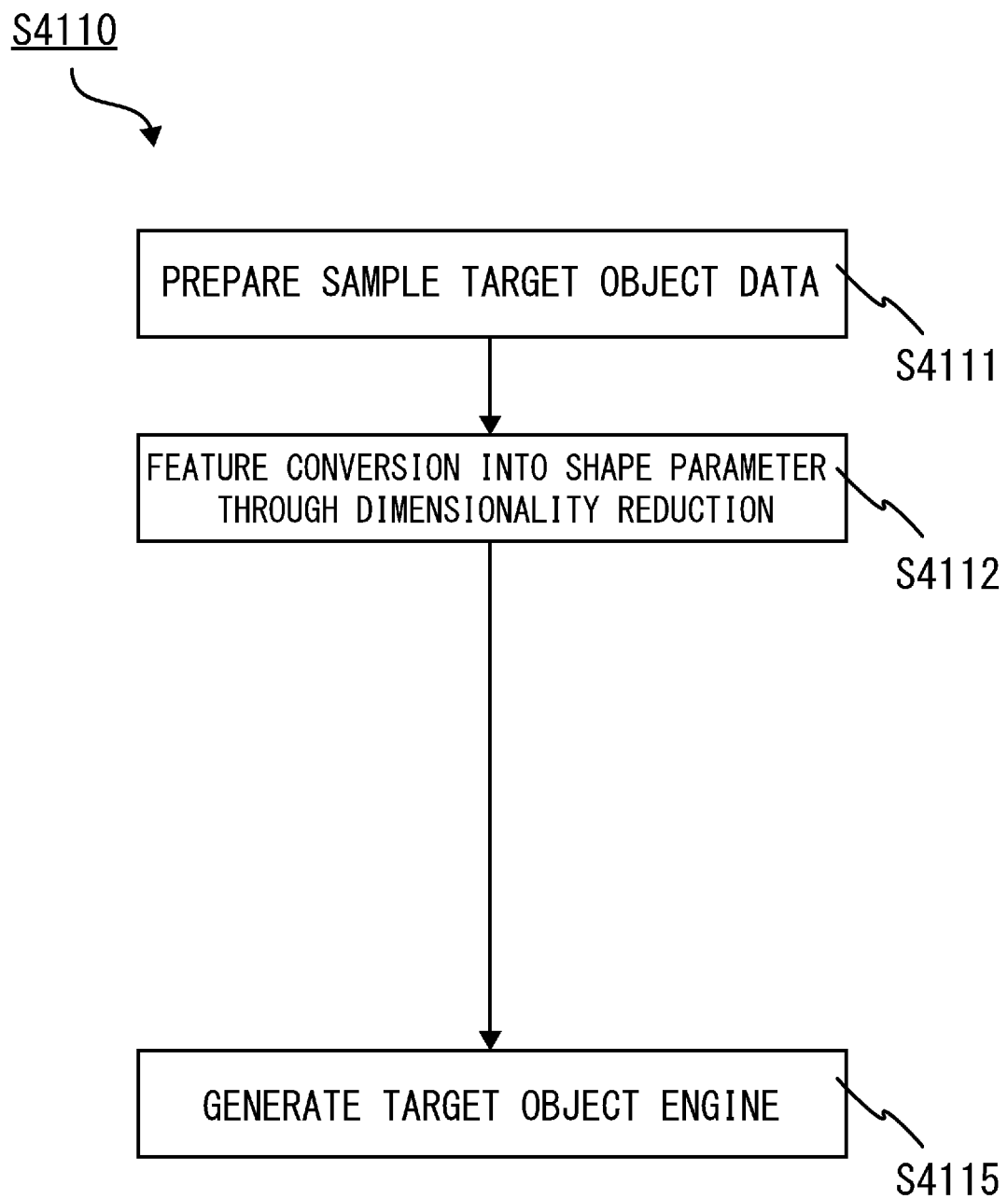
FIG. 21 is a flowchart showing the operation of the learning apparatus 4125 in FIG. 20.
Figure 22:
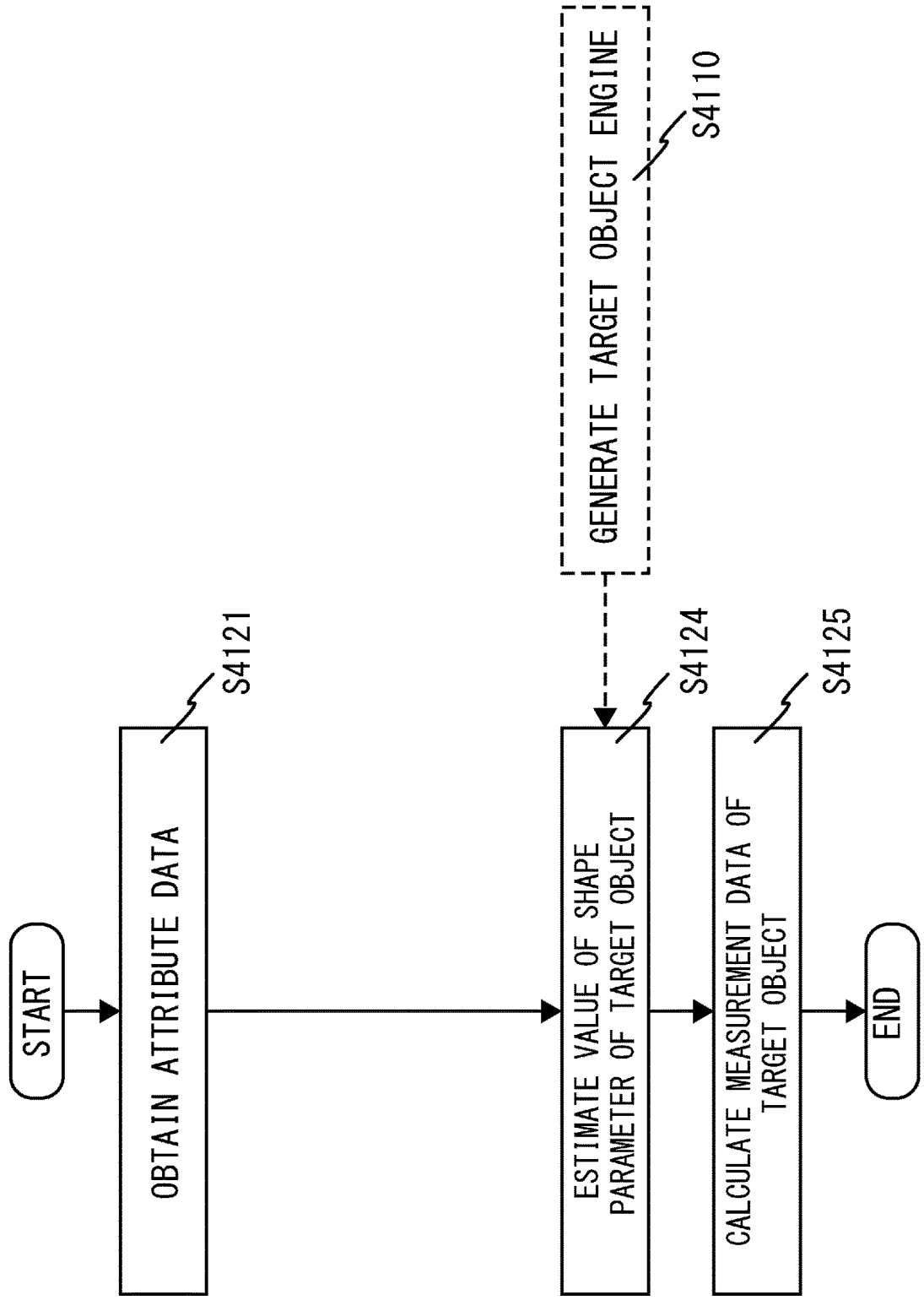
FIG. 22 is a flowchart showing the operation of the measurement data calculation apparatus 4020 in FIG. 20.

With reference to FIG. 21 and FIG. 22, the operation of the measurement data calculation system 4200 in FIG. 20 will be described. FIG. 21 is a flowchart showing the operation of the learning apparatus 4125 (S4110), in which the target object engine 4121A is generated based on the sample target object data. FIG. 22 is a flowchart showing operation of the measurement data calculation apparatus 4120, in which the measurement data of the target object is calculated based on the image data of the target object.

(4-2-1) The Operation of the Learning Apparatus

At first, the data of the sample target object is prepared and stored in the storage unit 4126 (S4111). In one example, the prepared data is the data for 400 sample target objects and includes the 5,000 three-dimensional data prepared for each sample target object and the attribute data prepared for each sample target object. The three-dimensional data includes the three-dimensional coordinate data of the vertexes included in the sample target object. In addition, the three-dimensional data may also include the vertex information for each mesh constituting the three-dimensional object and the mesh data of each vertex such as the normal direction.

In addition, like the first embodiment, the three-dimensional data of the sample target object is associated with the information of a region together with the vertex number.

The preprocessing unit 4127A then performs the feature conversion of the predetermined quantity (dimension) into the shape parameter (S4112) through dimensionality reduction. This feature conversion process is also similar to or the same as that of the first embodiment. In the foregoing example, as the result of the matrix operation using the projection matrix according to the principal component analysis, the feature conversion is performed on 15,000 dimensions (5,000×3) of data included in each of 400 sample target objects, which is converted into, for example, 30 dimensions of shape parameters of the principal component Λ.

The learning unit 4127B then uses, for the training data, the pair of the attribute data of a plurality of sample target objects prepared in S4111 and the data set of a plurality of shape parameters obtained in S4112 to perform the machine learning for the relationship of the pair (S4115).

Specifically, the learning unit 4027B obtains the conversion attribute data Y from the attribute data of the target object. The element of the conversion matrix Z which associates the element $y_r$ of the conversion attribute data Y with the element $\lambda_m$ of the shape parameter Λ is indicated as zrm. The conversion matrix Z is the matrix constituting of [s rows, n columns]. In addition, the symbol m meets the following condition: 1≤m≤n. In the foregoing example, n is 30, which is the number of dimensions of the shape parameter Λ. The symbol r meets the following condition: 1≤r≤s, wherein s is the number of the elements used for the operation obtained from the conversion attribute data Y.

For example, the attribute data of the target object is assumed to be constituted of the full length data h, the weight data w, and the elapsed time data a. In other words, the attribute data is the set of elements of (h, w, a). In this case, the learning unit 4027B obtains the square value of each element (h, w, a) in the attribute data of the target object (also referred to as secondary term), the multiplication value of each element (also referred to as interaction term), and the value of each element itself (also referred to as primary term).

As the result, the conversion attribute data Y having the following nine elements is obtained.

($h^2$ $w^2$ $a^2$ h·w w·a a·h h w a)

The learning unit 4027B then performs regression analysis on the pair of the conversion attribute data Y obtained from the attribute data associated with the 400 sample target object and the shape parameter Λ obtained from the three-dimensional data of the sample target object to obtain the conversion matrix Z constituting of [9 rows, 30 columns] shown below.

$$\begin{pmatrix} z_{1,1} & \cdots & \cdots & z_{1,30} \\ \vdots & \ddots & \ddots & \vdots \\ x_{9,1} & \cdots & \cdots & z_{9,30} \end{pmatrix}$$

The data of the conversion matrix Z obtained in this way is stored in the storage unit 4026 as the target object engine 4121A.

(4-2-2) The Operation of the Measurement Data Calculation Apparatus

The measurement data calculation apparatus 4120 stores the electronic file of the target object engine 4121A generated by the learning apparatus 4125 and the projection information of the principal component analysis obtained by the learning apparatus 4125 into the storage unit 4121 for use in the measurement data calculation of the target object.

The obtaining unit 4124A first obtains the attribute data of the target object through the input/output unit 4122 (S4121). In this way, the attribute data of the target object is received. The estimation unit 4124D subsequently uses the target object engine 4121A stored in the storage unit 4121 in advance to estimate the value of the shape parameter of the target object from the received attribute data (S4124).

For example, the attribute data of the target object is assumed to be constituted of the full length data h, the weight data w, and the elapsed time data a. In other words, the attribute data is the set of elements of (h, w, a). In S4124, as described above, the estimation unit 4124D obtains the conversion attribute data Y constituting of the square value of each element (h, w, a) in the attribute data of the target object, the multiplication value of each element, and the value of each element itself.

Finally, the calculation unit 4124E calculates the measurement data related to the region included in the target object based on the value of the shape parameter of the target object (S4125). Specifically, the conversion attribute data Y is calculated from the attribute data of the target object obtained by the obtaining unit 4124A. Then, the conversion attribute data Y is multiplied by the described above conversion matrix Z to calculate the shape parameter Λ. Subsequently, as in the third embodiment (S3025), the three-dimensional object is virtually constructed from the three-dimensional data and the measurement data between the two vertexes along the curved surface on the three-dimensional object is calculated. It should be noted that the vertex information for each mesh constituting the three-dimensional object and the mesh data of each vertex such as the normal direction can be used for the calculation of the stereoscopic distance.

In this way, the measurement data calculation apparatus 4120 according to the present embodiment can use the target object engine 4121A to estimate the value of the predetermined quantity of the shape parameters from the attribute data of the target object with a high accuracy. Unlike in the third embodiment, the image input of the target object is not necessary and S3022 (the extraction process of the shape data) and S3023 (the rescale process) in FIG. 13 are not required, resulting in high efficiency.

In addition, since the three-dimensional data of the target object can be reconstructed with a high accuracy from the value of the shape parameter estimated with a high accuracy, not only the identified site but also the interval between any two vertexes can be calculated with a high accuracy as a measurement target spot. In particular, the measurement data between the two vertexes to be calculated has a high accuracy because it is calculated along the stereoscopic shape based on the three-dimensional object constructed from the three-dimensional data.

(4-3) The Characteristics of the Measurement Data Calculation System

As described above, the measurement data calculation system 4200 according to the present embodiment includes a measurement data calculation apparatus 4120 and a learning apparatus 4125. The information processing apparatus configured as a part of the measurement data calculation apparatus 4120 includes an obtaining unit (a reception unit), 4124A, an estimation unit 4124D, and a calculation unit 4124E. The obtaining unit (the reception unit) 4124A receives the attribute data of the target object. The estimation unit 4124D uses the target object engine 4121A that associates the attribute data of the sample target object with the values of the predetermined quantity of the shape parameters associated with the sample target object to estimate the value of the shape parameter of the target object from the received attribute data. Then, the value of the shape parameter of the estimated target object is associated with the measurement data related to any region included in the target object.

Therefore, the measurement data calculation apparatus 4120 can use the target object engine 4121A created in advance to efficiently estimate the values of a predetermined quantity of the shape parameters from the attribute data. In addition, the values of the shape parameters are estimated with a high accuracy. In addition, the values of the shape parameters estimated with a high accuracy are used so that the data related to any region of the target object can be efficiently calculated with a high accuracy. In this way, according to the measurement data calculation apparatus 4120, the measurement data calculated for the target object can be efficiently provided with a high accuracy.

(4-4) The Application to the Product Manufacturing System

Figure 23:
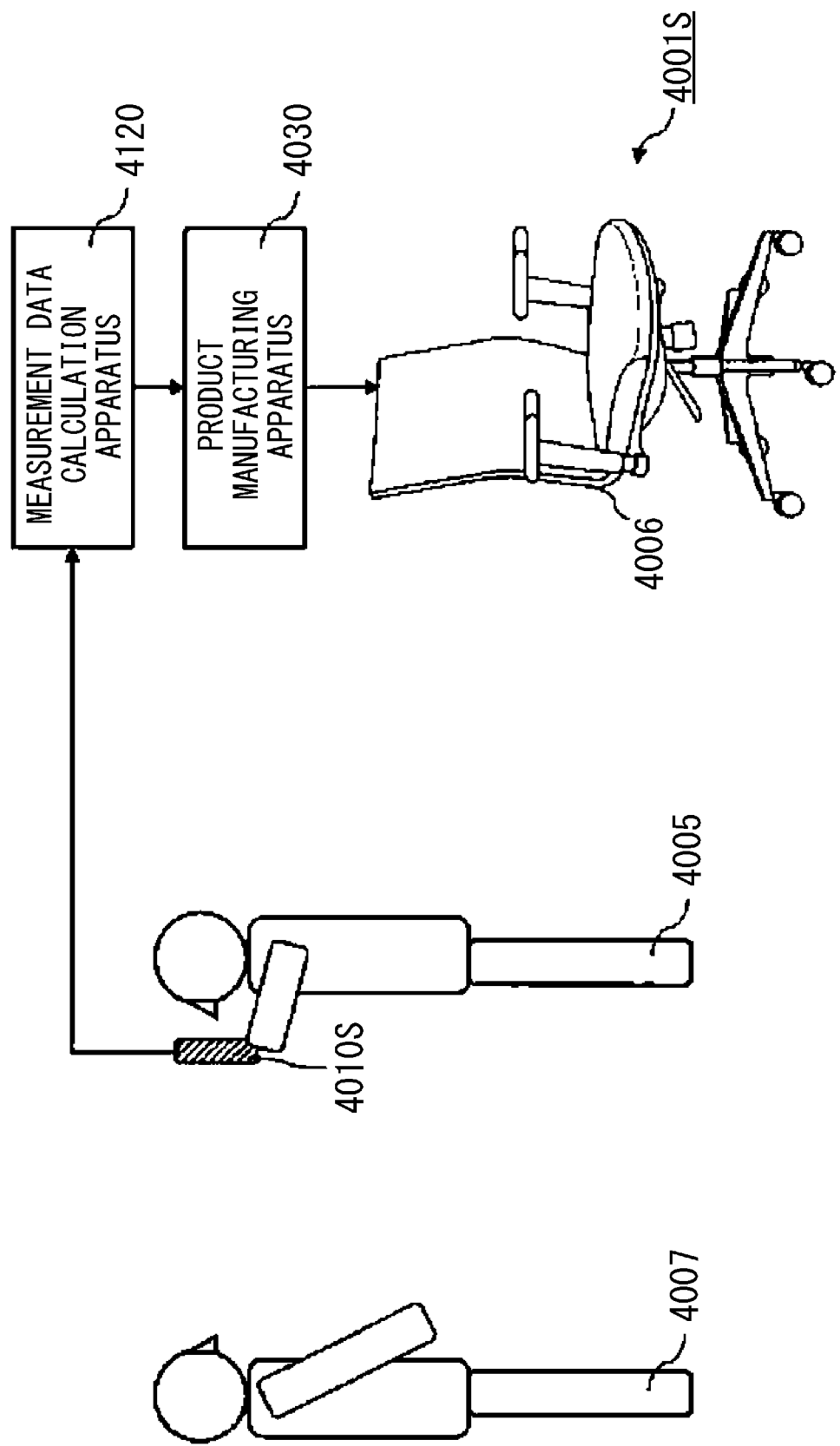
FIG. 23 is a schematic view showing the concept of a product manufacturing system 4001S according to the fourth embodiment.

FIG. 23 is a schematic view showing the concept of the product manufacturing system 4001S according to the present embodiment. Like the measurement data calculation apparatus 3020 according to the third embodiment, the measurement data calculation apparatus 4120 according to the present embodiment can also be applied to the product manufacturing system 4001S.

The terminal apparatus 4010S according to the present embodiment may be anything as long as it receives the input of the attribute data indicating the attribute of the target object 4007. The "attribute" includes the full length, the weight, the elapsed time since generation (including the age), and the like of the target object 1007.

In addition, as described above, the processing unit 4124 in the measurement data calculation apparatus 4120 serves as an obtaining unit 4124A, an estimation unit 4124D, and a calculation unit 4124E. Based on the value of the shape parameter of the target object obtained by the estimation unit 4124D, the calculation unit 4124E calculates the measurement data related to the region included in the target object.

Since in the product manufacturing system 4001S the measurement data calculation apparatus 4120 efficiently and accurately calculates the measurement data of the target object 1007, the desired product related to the shape of the target object 1007 can be provided. Besides, the product manufacturing system 4001S according to the third embodiment can offer the effects that are similar to or the same as the product manufacturing system 3001 of the fourth embodiment.

Figure 24:
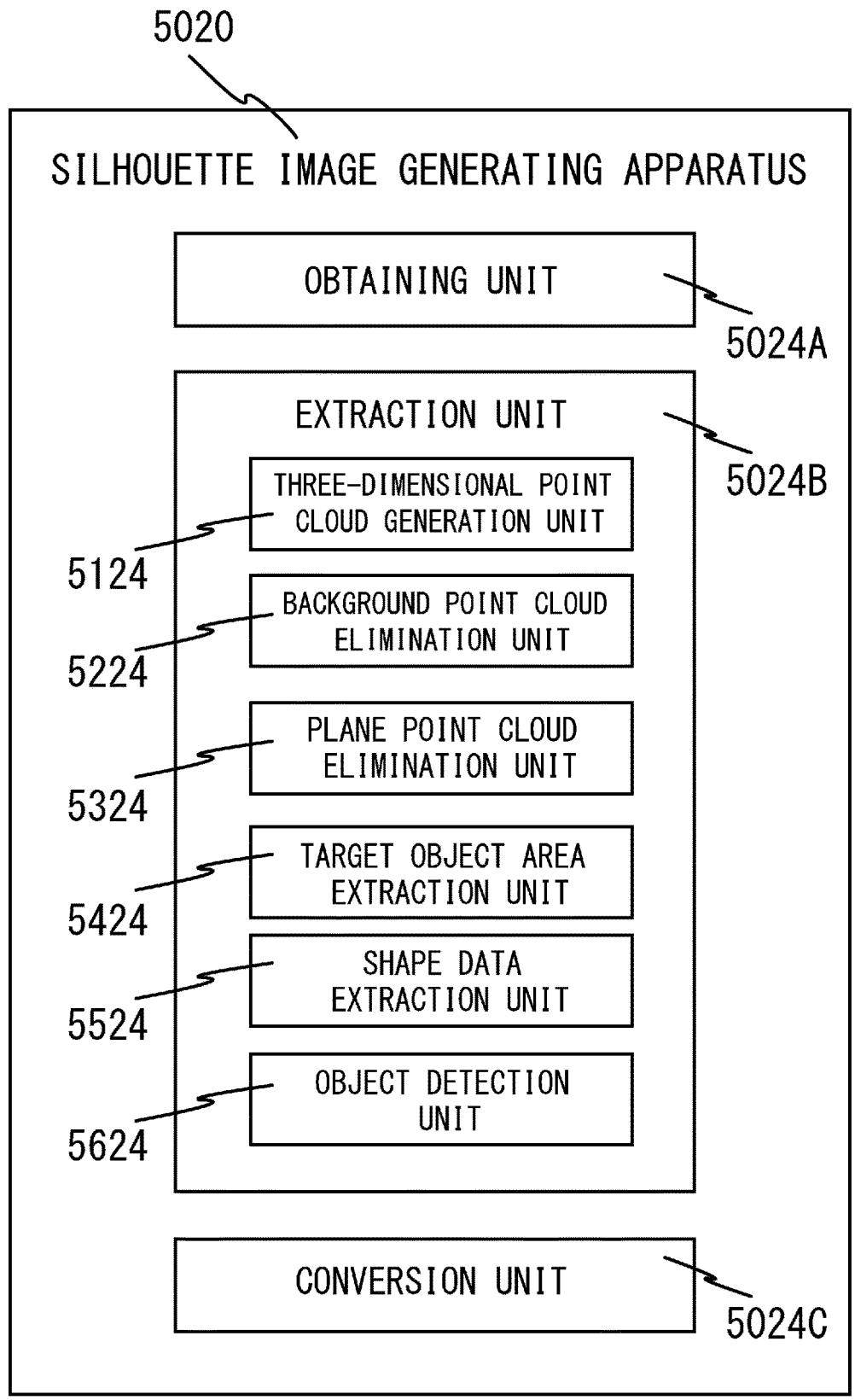
FIG. 24 is a schematic view showing the configuration of a silhouette image generating apparatus 5020 according to another embodiment.

Another Embodiment: A Silhouette Image Generating Apparatus (5-1) The Configuration of the Silhouette Image Generating Apparatus FIG. 24 is a schematic view showing the configuration of the silhouette image generating apparatus 5020 according to another embodiment. The silhouette image (including the gradation silhouette image) generated in the first embodiment and the third embodiment may be generated by the silhouette image generating apparatus 5020. In other words, the silhouette image generating apparatus 5020 may be configured as a part of the measurement data calculation apparatus 1020 according to the first embodiment, or a part of the measurement data calculation apparatus 3020 according to the third embodiment.

The silhouette image generating apparatus 5020 can be achieved by any computer and includes an obtaining unit 5024A, an extraction unit 5024B, and a conversion unit 5024C.

The obtaining unit 5024A may correspond to all or a part of the obtaining unit 1024A in the measurement data calculation apparatus 1020 according to first embodiment, and/or the obtaining unit 3024A in the measurement data calculation apparatus 3020 according to the third embodiment. In addition, the extraction unit 5024B may correspond to all or a part of the extraction unit 1024B in the measurement data calculation apparatus 1020 according to the first embodiment and/or the extraction unit 3024B in the measurement data calculation apparatus 3020 according to the third embodiment. Likewise, the conversion unit 5024C may correspond to all or a part of the conversion unit 1024C in the measurement data calculation apparatus 1020 according to the first embodiment and/or the conversion unit 3024C in the measurement data calculation apparatus 3020 according to the third embodiment.

The obtaining unit 5024A obtains the image data in which the target object is photographed. The obtaining unit 5024A obtains, for example, the plurality of image data in which the image capture apparatus photographs the target object in plurality of different directions. Herein, the depth data measurement apparatus that can obtain the depth data can be applied and the depth map having the depth data for each pixel based on the depth data is constructed. The depth data measurement apparatus is applied so that the image data which can be obtained by the obtaining unit 5024A can include the RGB-D (Red, Green, Blue, Depth) data. Specifically, the image data can obtain the depth map in addition to the RGB image data which can be obtained with a typical monocular camera.

One example of the depth data measurement apparatus is a stereo camera and in the following description the stereo camera is applied. When the target object (particularly a person) is photographed with the stereo camera, the user should be guided to include the entire target object within a predetermined range of the display so that the target object can be identified accurately. In one example, a guide region may be displayed or a guide message is displayed on the display to prompt the user. In this way, the target object can be positioned at a desired direction and distance from the stereo camera and the noise during the generation of the silhouette image can be reduced.

The extraction unit 5024B extracts the shape data indicating the shape of the target object from the image data. In more detail, the extraction unit 5024*b* includes the three-dimensional point cloud generation unit 5124, a background point cloud elimination unit 5224, a plane point cloud elimination unit 5324, a target object area extraction unit 5424, a shape data extraction unit 5524, and an object detection unit 5624.

The three-dimensional point cloud generation unit 5124 generates the three-dimensional point cloud data from the obtained depth map and places the three-dimensional point cloud constituting of a group of points in the virtual three-dimensional coordinate space. Each point has a three-dimensional coordinate in the virtual three-dimensional space. It should be noted that in the virtual three-dimensional coordinate space the stereo camera is virtually placed on the origin and the three-dimensional coordinate (xyz) is defined in accordance with the orientation of the stereo camera. In particular, the optical axis direction of the stereo camera is defined as the depth direction (the z axis direction).

The background point cloud elimination unit 5224 eliminates, among the generated three-dimensional point cloud data, the data of the three-dimensional point cloud that is more than a predetermined distance away along the depth direction of the virtual three-dimensional coordinate space. Since the eliminated points are far away from the stereo camera, it can be regarded as constituting the background image. The background portion may be removed from the image data in which the target object is photographed. In this way, since the three-dimensional point cloud causing the noise can be effectively removed, the particular accuracy of the target object area extracted by the target object area extraction unit 5424 can be improved.

The plane point cloud elimination unit 5324 can eliminate the three-dimensional point cloud data that exists corresponding to the planar portion among the generated three-dimensional point cloud data. In order to accurately identify the target object area, the planar portion existing among the target object may be identified and removed from the image data in which the target object is photographed. To do so, the planar portion needs to be estimated using the generated data of the three-dimensional point cloud.

Specifically, the plane point cloud elimination unit 5324 may operate as following.

At first, from the three-dimensional point cloud data generated from the depth map, the planar portion in the image data is estimated. Herein, the plane is, for example, the floor. In other words, if the target object is a person, the planar portion is the floor portion to which a standing person contacts.

In general, the xyz coordinate plane in the three-dimensional space is represented with the following equation f (x, y, z)=0.

$$f(x, y, z) = ax + by + cz + d = 0$$

In one example, in the virtual three-dimensional coordinate space in which the three-dimensional point cloud is placed, one planar portion is selected among a plurality of sample planes sampled by a known random sampling method. The algorithm for the robust estimation according to Random Sample Consensus (RANSAC) can be typically applied to the random sampling.

In more detail, at first, the normal vector (a, b, c) and d is randomly determined to sample the sample plane. Subsequently, for the sample plane, the points of the three-dimensional point cloud that meet the following inequality are identified depending on how much three-dimensional point cloud is associated. It should be noted that the DST is a predetermined threshold distance.

$$|f(x, y, z)| = |ax + by + cz + d| \leq DST$$

The points (each having values of x, y, z) that meet the above described inequality are regarded as existing on the sample plane among the three-dimensional point cloud. Although theoretically the threshold distance DST=0, in consideration of the photographing environment, the performance of the stereo camera, or the like, the threshold distance DST may be preset to a value close to zero in order to include the three-dimensional point cloud data within a predetermined small distance from the sample plane as well. Among a plurality of sample planes determined randomly, the sample plane including a large number of the three-dimensional point cloud that meets the above described inequality, that is, the sample plane having the largest content ratio of the three-dimensional point cloud is estimated to be the desired planar portion in the image data.

In other words, since the plane point cloud elimination unit 5324 repeats the extraction of the sample plane multiple times and then determines the sample plane having the largest content ratio of the three-dimensional point cloud, the robustness for the estimation of the desired planar portion can be increased.

The plane point cloud elimination unit 5324 continues to eliminate the three-dimensional point cloud data of the points that exist in the estimated planar portion from the generated three-dimensional point cloud data. The planar portion having the points to be eliminated is, for example, the floor portion in the image data. In other words, the plane point cloud elimination unit 5324 can remove the floor portion from the image data in which the target object is photographed. In this way, since the three-dimensional point cloud causing the noise can be effectively removed, the identification accuracy for the target object area of the target object extracted by the target object area extraction unit 5424 can be improved.

In addition, the process performed by the plane point cloud elimination unit 5324 may be repeated to further estimate another planar portion and further eliminate the three-dimensional point cloud data of the points existing in the another planar portion. For example, after the floor portion is estimated and the three-dimensional point cloud data thereof is temporarily eliminated from the entire three-dimensional point cloud data, the plane is again estimated among the sample planes sampled by the foregoing random sampling method. In this way, the portion of the wall can be in turn estimated. In other words, not only the three-dimensional point cloud data of the floor portion but also that of the wall portion can be removed from the image data and the accuracy with which the target object area of the target object is identified can be further improved.

It should be noted that the accuracy with which the planar portion is estimated depends on the photographing environment in which the target object is photographed. For example, in order to accurately perform the estimation of the planar portion, the number of points constituting the planar portion needs to be larger than the number of points constituting the target object. Therefore, for example, a user may select the photographing environment in which many walls are not captured, the stereo camera in a store may be fixed at a location in in which many walls are not captured, or another consideration may be given.

The target object area extraction unit 5424 uses the three-dimensional point cloud data to extract the target object area of the target object. The three-dimensional point cloud data on which the elimination has been performed by the background point cloud elimination unit 5224 and/or the plane point cloud elimination unit 5324 from the three-dimensional point cloud generated by the three-dimensional point cloud generation unit 5124 based on the depth map, that is, the three-dimensional point cloud data after denoising, is used to further identify the three-dimensional point cloud corresponding to the target object. For example, the three-dimensional point cloud within a predetermined space range in a virtual three-dimensional space may be identified. Then, the target object area of the target object in the image data can be extracted based on the identified three-dimensional point cloud data. The target object area extracted in such a way has been subject to an effective denoising process and has a high accuracy. In this way, the accuracy of the silhouette image converted by the conversion unit 5024C can be further improved.

The shape data extraction unit 5524 extracts the shape data indicating the shape of the target object based on the depth data of the region within the depth map corresponding to the target object area extracted by the target object area extraction unit 5424.

The object detection unit 5624 uses the RGB image data obtained by the obtaining unit 5024A to extract the image area of the target object in the image data through object detection. The image area of the target object is defined as the region of two-dimension (xy) coordinate perpendicular to the depth (z) direction. Any known approach may be used for the object detection. For example, the identification of a region using an object detection algorithm according to deep learning can be applied. One example of the object detection algorithm according to deep learning is Regions with Convolutional Neural Networks (R-CNN).

The foregoing three-dimensional point cloud generation unit 5124 may also generate the three-dimensional point cloud data based on the depth map of the portion corresponding to the image area extracted by the object detection unit 5624. In this way, the three-dimensional point cloud data with even lower noise can be generated, and as the result, the accuracy of the shape data extracted by the shape data extraction unit 5524 can be improved.

The conversion unit 5024C converts the shape data extracted by the shape data extraction unit 5524 to generate the silhouette image of the target object. The silhouette image to be converted may not be represented by mere binarized data of black and white but may be a monochrome image (gradation silhouette image) with single color multiple gradation in which, for example, the luminance value in the image area of the target object is represented by the data from 0 (black) to 1 (white) based on the depth data. In other words, the image area of the target object is associated with the depth data so that the silhouette image data can have even more amount of information.

(5-2) The Operation of the Silhouette Image Generating Apparatus

Figure 25:
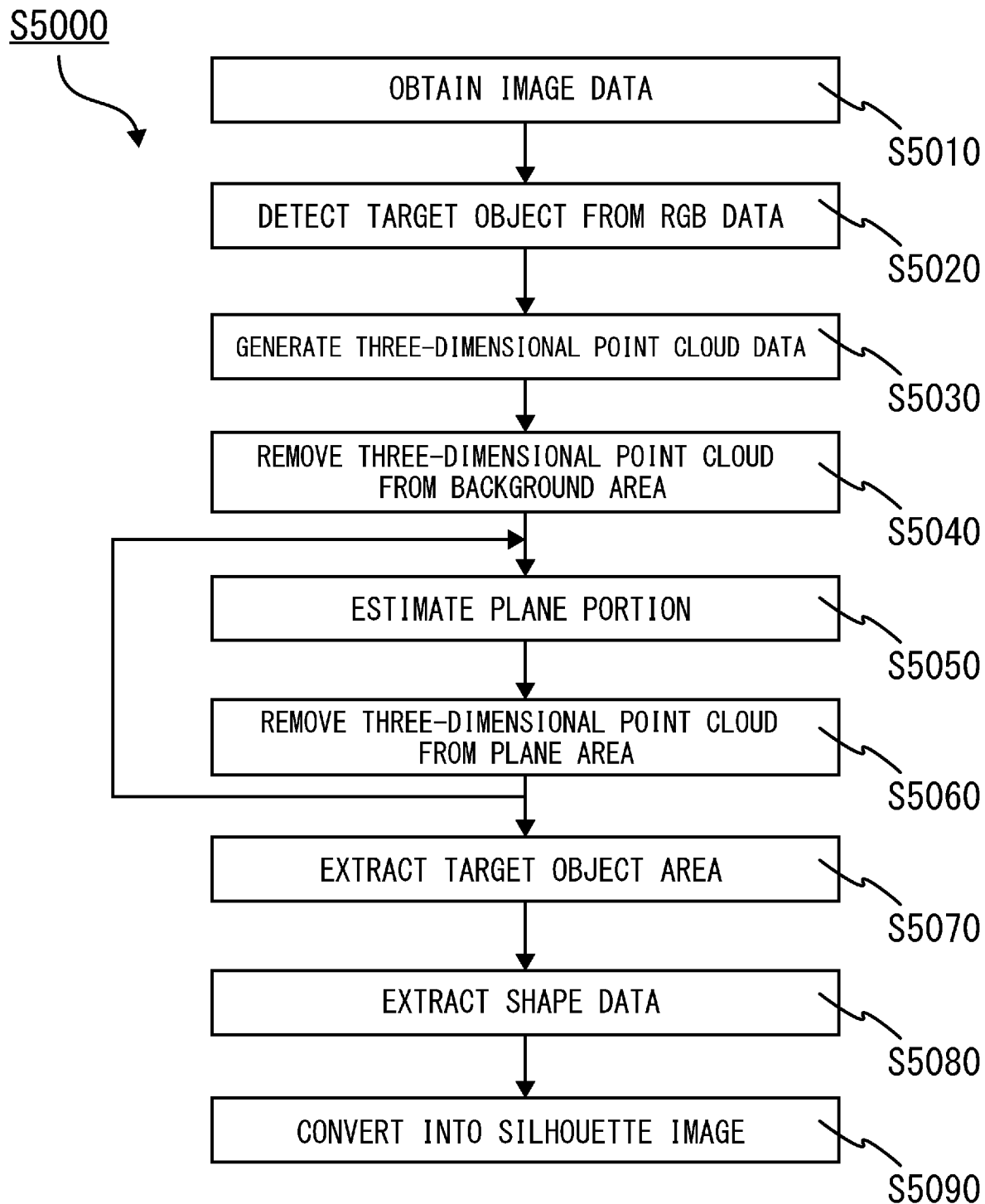
FIG. 25 is a flowchart for describing the operation of the silhouette image generating apparatus 5020 according to the embodiment.

FIG. 25 is a flowchart for describing the operation of the silhouette image generating apparatus 5020 according to the other embodiment described in FIG. 24. Through the flowchart, the silhouette image of the target object can be generated from the image data in which the target object is photographed (S5000).

The obtaining unit 5024A first obtains the image data including the depth map in which the target object is photographed (S5010). The object detection unit 5624 then extracts the image area of the target object from the RGB image data included in the image data (S5020). It should be noted that this step may be optional. The three-dimensional point cloud generation unit 5124 then generates the three-dimensional point cloud data corresponding to the depth map included in the image data to construct the virtual three-dimensional coordinate space (S5030). If S5020 has been performed, the three-dimensional point cloud data may be generated based on the depth map of the portion corresponding to the image area (the xy coordinate region) of the target object.

The background point cloud elimination unit 5224 then eliminates the three-dimensional point cloud data that is more than a predetermined threshold distance away along the depth (z) direction of the virtual three-dimensional coordinate space (S5040). In addition, the plane point cloud elimination unit 5324 estimates the planar portion in the image data (S5050), and further eliminates the three-dimensional point cloud data corresponding to the planar portion from the three-dimensional point cloud data (S5060). It should be noted that S5050 to S5060 may be repeated to estimate a plurality of planar portions in the image data and eliminate the three-dimensional point cloud data.

The target object area extraction unit 5424 then extracts the target object area of the target object based on the three-dimensional point cloud data on which the elimination has been performed (S5070). Then, based on the depth data of the target object area in the depth map, the shape data extraction unit 5524 extracts the shape data indicating the shape of the target object (S5080). Finally, the conversion unit 5024C converts the shape data to generate the silhouette image of the target object.

(5-3) The Characteristics of the Silhouette Image Generating Apparatus.

(5-3-1) As described above, the silhouette image generating apparatus 5020 according to the present embodiment includes an obtaining unit 5024A, an extraction unit 5024B, and a conversion unit 5024C. The obtaining unit 5024A obtains the image data including the depth map in which the target object is photographed. The extraction unit 5024B uses the three-dimensional point cloud data generated from the depth map to extract the target object area of the target object and extract the shape data indicating the shape of the target object based on the depth data of the depth map corresponding to the target object area. The conversion unit 5024C converts the shape data to generate the silhouette image of the target object.

Therefore, the silhouette image generating apparatus 5020 uses the depth map to generate the three-dimensional point cloud data and then generates the silhouette image of the target object. Since in the three-dimensional point cloud data the three-dimensional point cloud causing the noise can be effectively identified and removed, the identification accuracy of the target object area of the target object can be improved. In this way, the silhouette image can be obtained with a high accuracy. In addition, the depth map is used so that the gradation silhouette image which is a monochrome image associated with the data can be generated as the silhouette image and can have more amount of information related to the shape of the target object.

(5-3-2) In addition, the extraction unit 5024B in the silhouette image generating apparatus 5020 extracts the target object area of the target object based on the three-dimensional point cloud data in which three-dimensional point cloud data that is more than a predetermined threshold distance away along the depth direction has been eliminated. In this way, since the three-dimensional point cloud constituting the background and causing the noise in the screen data can be effectively removed, the identification accuracy of the target object area of the target object extracted by the target object area extraction unit 5424 can be improved.

(5-3-3) In addition, the extraction unit 5024B in the silhouette image generating apparatus 5020 further estimates the planar portion in the image data from the three-dimensional point cloud data generated from the depth map and extracts the target object area of the target object based on the three-dimensional point cloud data in which three-dimensional point cloud data that exists in the estimated planar portion has been eliminated.

(5-3-4) Herein, the extraction unit 5024B estimates the planar portion based on the calculation of the content ratio of the three-dimensional point cloud data associated with the sample plane sampled according to random sampling. Then, the estimation is repeated to estimate the planar portion. In this way, since the extraction of the sample plane is repeated multiple times and then the sample plane with the largest content ratio of the three-dimensional point cloud data is determined, the robustness for the estimation of the desired planar portion can be increased.

In addition, the extraction unit 5024B repeats the process to estimate the planar portion to estimate a plurality of planar portions. In this way, since the three-dimensional point cloud constituting the plane and causing the noise in the screen data can be effectively removed, the identification accuracy of the target object area of the target object extracted by the target object area extraction unit 5424 can be improved.

(5-3-5) Furthermore, in the silhouette image generating apparatus 5020, the obtaining unit 5024A further obtains the RGB image data and the extraction unit 5024B further uses the RGB image data to extract the image area of the target object and generates the three-dimensional point cloud data from the depth map of the portion corresponding to the image area. Before the generation of the three-dimensional point cloud data, the image area of the target object is extracted in advance so that the identification accuracy of the target object area of the target object that is extracted by the target object area extraction unit 5424 can be further improved.

(5-3-6) Furthermore, in the present embodiment, it is preferable that the target object is a person and the planar portion includes a floor. In this way, the silhouette of the person standing on the floor can be effectively generated.

Another Embodiment: Terminal Apparatus

Figure 26:
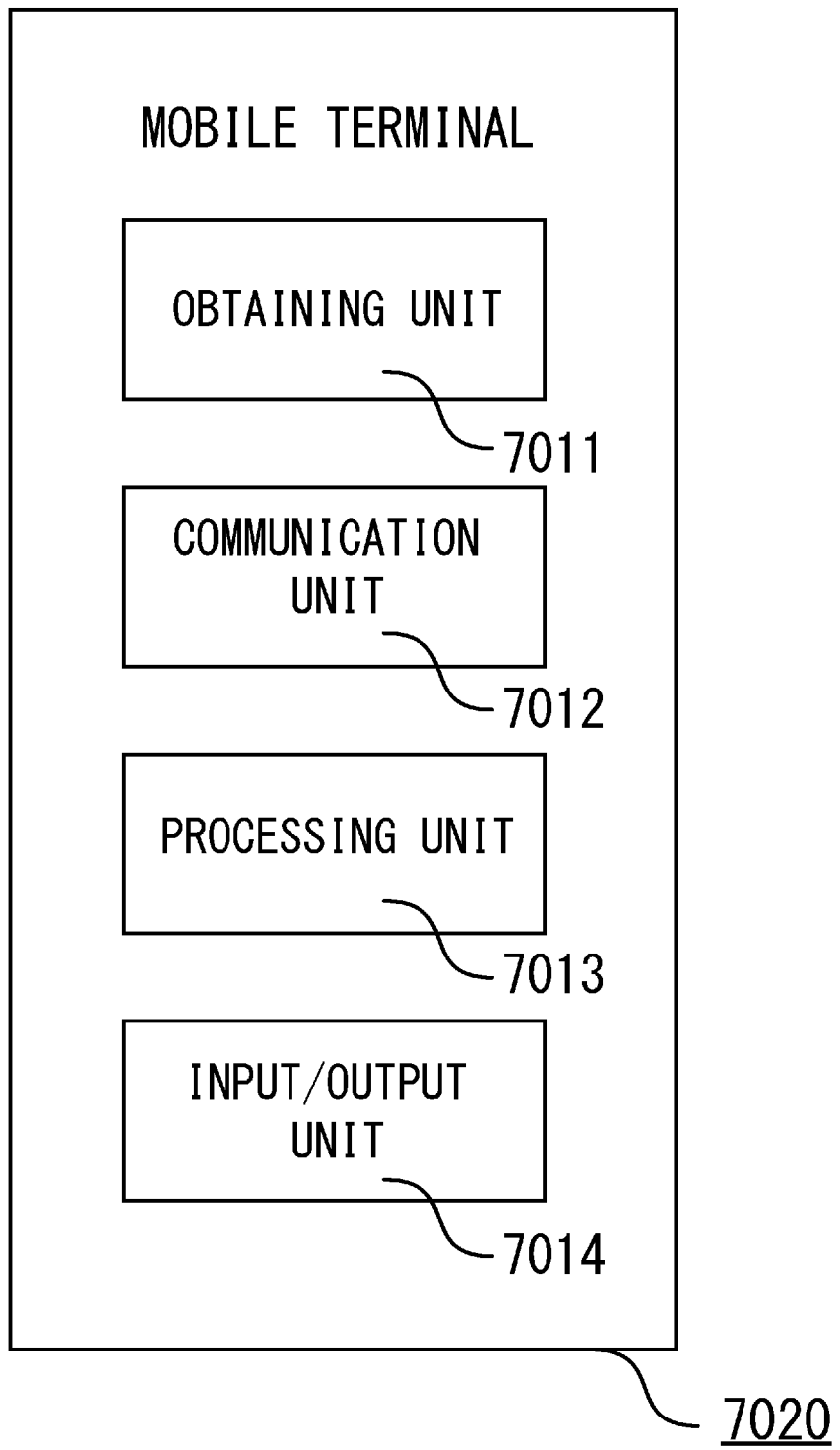
FIG. 26 is a schematic view showing the configuration of a terminal apparatus 7020 according to another embodiment.

FIG. 26 is a schematic view showing the configuration of the terminal apparatus 7020 according to another embodiment.

The terminal apparatus 7020 includes each function of the terminal apparatus 1010 according to the first embodiment, the terminal apparatus 2010S according to the second embodiment, the terminal apparatus 3010 according to the third embodiment, or the terminal apparatus 4010S according to the fourth embodiment. In addition, it can be connected to each measurement data calculation apparatus 1020, 2120, 3020, 4120, and 6020 described above. Furthermore, the terminal apparatus 7020 is not limited to the measurement data calculation apparatus, but can be connected to any information processing apparatus that processes the information related to the target object 7007 from the image data in which the target object 7007 is photographed.

The terminal apparatus 7020 has an obtaining unit 7011, a communication unit 7012, a processing unit 7013, and an input/output unit 7014.

The obtaining unit 7011 obtains the image data in which the target object 7007 is photographed. For example, the obtaining unit 7011 is constituted of any monocular camera. The data obtained by the obtaining unit 7011 is processed by the processing unit 7013.

The communication unit 7012 is achieved by a network interface such as any network card and allows the communication with the communication appliance on the network through a wired or wireless manner.

The processing unit 7013 is achieved by a processor such as a Central Processing Unit (CPU) and/or a Graphical Processing Unit (GPU) and a memory to perform various types of information processing, and performs the processing when the program is read. Herein, the processing unit (the determination unit) 7013 determines whether the target object included in the image data (that is, captured in the image data) is the target object registered in advance. In detail, the processing unit 7013 uses a "target object identification model" that identifies whether a target is the predetermined target object for each pixel to determine whether the target object included in the image data is the target object registered in advance.

The input/output unit 7014 receives the input of various types of information into the terminal apparatus 7020 and/or outputs various types of information from the terminal apparatus 7020. For example, the input/output unit 7014 is achieved by any touch panel. The input/output unit (the reception unit) 7014 shows the determination result of the processing unit 7013 described later on the screen (the output unit) of the input/output unit 7014. In addition, the input/output unit 7014 shows the image data for determination, which is obtained from the identification result for each pixel identified using target object identification model and is superimposed with the image data obtained by the obtaining unit 7011, on the screen of the input/output unit 7014.

Figure 27:
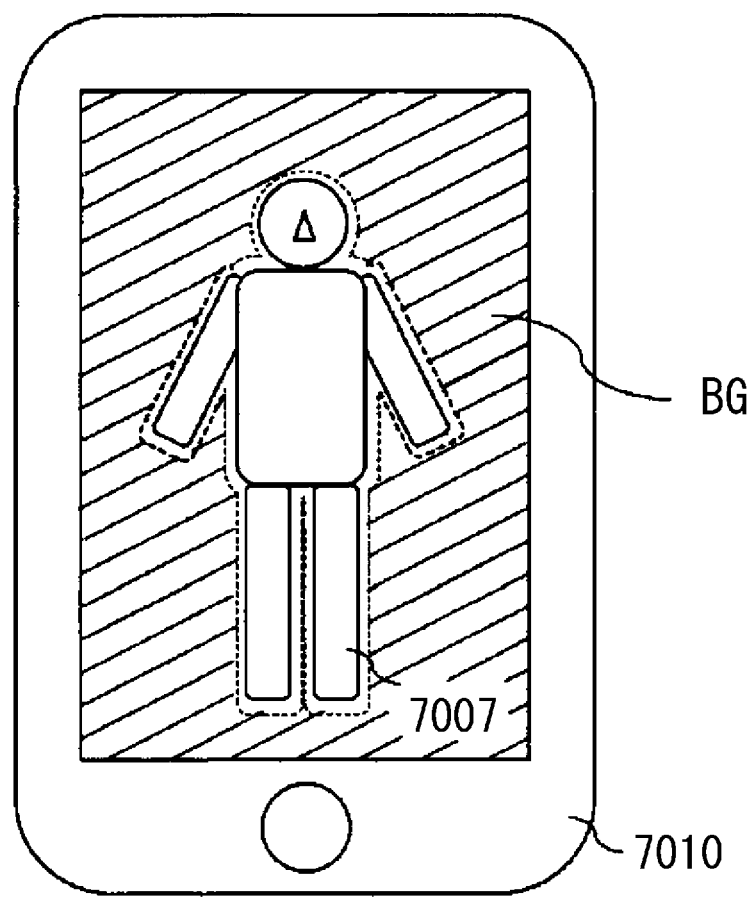
FIG. 27 is a schematic view showing one example of a screen displayed on the terminal apparatus 7020 in FIG. 26.

For example, as shown in FIG. 27, the target object 7007 (herein a person) is displayed by being superimposed with the image data of the region BG (the portion with diagonal lines in FIG. 27) other than the target object. For superimposing, an approach to superimpose and render a transparent image, such as alpha blend, may be used. In addition, the input/output unit (the reception unit) 7014 receives the input indicating whether to transmit the image data to an information processing apparatus (for example, the measurement data calculation apparatus 1020, 2120, 3020, 4120, 6020). In this way, the user sees the rendered and superimposed image to confirm that an object causing misidentification is not captured, and then the image data can be transmitted to the measurement data calculation apparatus.

Figure 28:
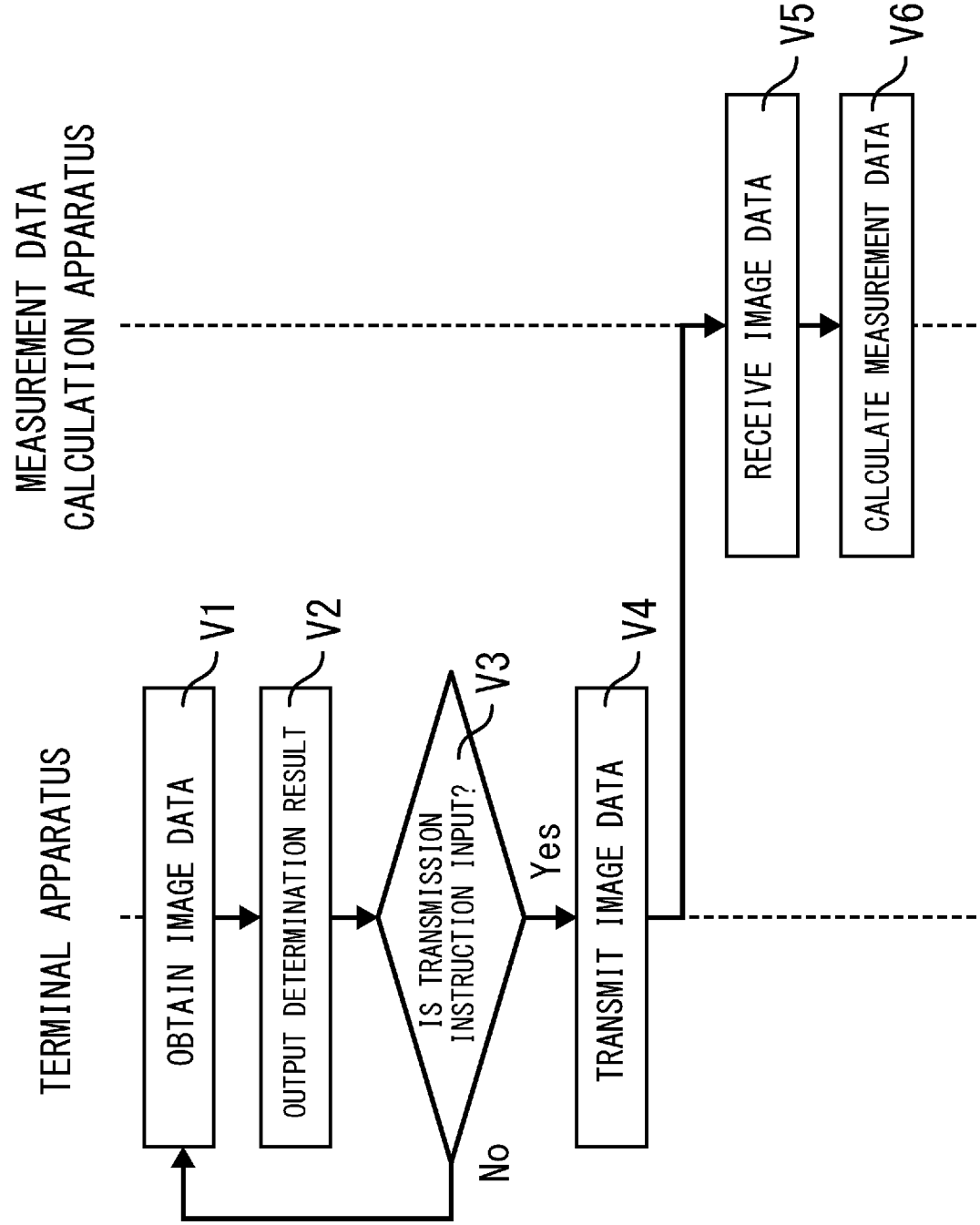
FIG. 28 is a sequence diagram for describing the operation of the terminal apparatus 7020 in FIG. 26.

FIG. 28 is a sequence diagram between a terminal apparatus 7020 and an information processing apparatus (for example, the measurement data calculation apparatus 1020, 2120, 3020, 4120, and 6020) for describing the operation of the terminal apparatus 7020.

At first, through the operation performed by a user, the image data of the target object 7007 is obtained via the terminal apparatus 7020 (V1). The terminal apparatus 7020 then uses a target object identification model to determine whether the target object 7007 included in the image data is the target object that is registered in advance and outputs the determination result on the screen constituting the input/output unit 7014 (V2). For example, the screen shown in FIG. 27 is displayed as the determination result.

Then, through the operation performed by the user, whether the obtained image data is to be transmitted to the measurement data calculation apparatus is input via the terminal apparatus 7020 (V3). When the terminal apparatus 7020 receives from the input/output unit 7014 the input allowing the transmission, the terminal apparatus 7020 transmits the obtained image data to the measurement data calculation apparatus via the communication unit 7012 (V3—Yes, V4).

Then, the measurement data calculation apparatus that has received the image data uses the image data transmitted from the terminal apparatus 7020 to calculate the measurement data of the target object 7007 (V5, V6).

As described above, since the above described terminal apparatus 7020 outputs the determination result about whether the target object included in the image data is the target object registered in advance and also receives the input about whether the image data is to be transmitted to the measurement data calculation apparatus, a terminal apparatus which may reduce the operation duration by the user can be provided.

In more detail, the measurement data calculation apparatus 1020, 2120, 3020, 4120, 6020 receive the image data, separate the background through segmentation, and generate the silhouette image. The measurement data calculation apparatus then calculates the measurement data of, for example, each portion of the human body. In such measurement data calculation apparatus, the reliability of the calculation result cannot be confirmed until the terminal apparatus 7020 transmits the image data to the measurement data calculation apparatus and the measurement data calculation apparatus completes the information processing on the image data. Then, if the reliability of the calculation result is low, the user needs to use the terminal apparatus 7020 to obtain the image data again. In contrast, if the above described terminal apparatus 7020 is used, the user can be prompted to confirm the validity of the image data before the image data in which the target object is captured is transmitted. This may reduce the time required for the measurement data calculation apparatus to obtain the calculation result with a high reliability.

For example, even in the environment such as a store in which various colors are arranged or in the environment in which a mannequin is misidentified for a human body, the measurement data calculation apparatus can perform the generation of the silhouette image while the user of the terminal apparatus 7020 predicts and confirms the success of the generation, which may reduce the operation duration.

It should be noted that the target object identification model installed in the terminal apparatus 7020 is required to quickly perform the segmentation. Therefore, the model that allows a quick inference is preferable even if the accuracy of the segmentation is compromised to some extent. In other words, both of the segmentation on the side of the measurement data calculation apparatus and the segmentation on the side of the terminal apparatus 7020 are prepared so that both of the generation of the silhouette image with a high accuracy and the remove of unwanted objects can be achieved.

The present disclosure is not exactly limited to each embodiment described above. In the implementation phase, the present disclosure can be embodied with the components being modified as long as it does not deviate from the concept. In addition, in the present disclosure, a plurality of component disclosed in each of the above described embodiments can be combined as appropriate to create various disclosures. For example, some components may be deleted from all components shown in the embodiments. Furthermore, the component in the different embodiments may be combined as appropriate.

What is claimed is:

1. An apparatus comprising:
an obtaining unit for obtaining image data in which a target object is photographed and full length data of the target object;
an extraction unit for extracting shape data indicating a shape of the target object from the image data;
a conversion unit for converting the shape data based on the full length data; and
a calculation unit for performing a dimensionality reduction of shape data converted by the conversion unit and calculating measurement data of each portion of the target object using a value of each of the reduced dimensions and a weighting factor optimized for each portion of the target object; wherein
the calculation unit is configured to:
perform a first dimensionality reduction on the shape data converted by the conversion unit;
perform a linear combination of a value of each dimension obtained in the first dimensionality reduction and a weighting factor optimized for each portion of the target object to obtain a predetermined value, or generate a secondary feature value from a value of each dimension obtained in the first dimensionality reduction and combine the secondary feature value with a weighting factor optimized for each portion of the target object to obtain a predetermined value;
use the predetermined value and attribute data including at least an attribute of a length and a weight of the target object to perform a second dimensionality reduction; and
calculate measurement data of each portion of the target object based on a value of each dimension obtained by the second dimensionality reduction.

2. An apparatus comprising:
an obtaining unit for obtaining a plurality of image data in which a target object is photographed in different directions and full length data of the target object;
an extraction unit for extracting shape data indicating a shape of the target object from the image data;
a conversion unit for converting the shape data based on the full length data; and
a calculation unit for performing a dimensionality reduction of shape data converted by the conversion unit and calculating measurement data of each portion of the target object using a value of each of the reduced dimensions and a weighting factor optimized for each portion of the target object; wherein
the calculation unit is configured to:
perform a first dimensionality reduction on the shape data converted by the conversion unit;
perform a linear combination of a value of each dimension obtained in the first dimensionality reduction and a weighting factor optimized for each portion of the target object to obtain a predetermined value, or generate a secondary feature value from a value of each dimension obtained in the first dimensionality reduction and combine the secondary feature value with a weighting factor optimized for each portion of the target object to obtain a predetermined value;
use the predetermined value and attribute data including at least an attribute of a length and a weight of the target object to perform a second dimensionality reduction; and
calculate measurement data of each portion of the target object based on a value of each dimension obtained by the second dimensionality reduction.

3. The apparatus according to claim 1, wherein the extraction unit is configured to use an algorithm of semantic segmentation built with teacher data prepared for each type of a target object to extract a target object area included in the image data, so as to extract shape data of the target object.

4. The apparatus according to claim 1, wherein the target object is a person.

5. The apparatus according to claim 1, wherein the image data includes a depth map, and shape data extracted by the extraction unit is associated with depth data of the target object in the depth map.

6. The apparatus according to claim 5, wherein the extraction unit is configured to extract a target object area of the target object from the image data based on the depth map, and
in the target object area, the shape data is associated with depth data of the target object.

7. The apparatus according to claim 6, wherein the conversion unit is configured to convert the shape data into new shape data based on the full length data and depth data of the target object area.

8. The apparatus according to claim 1, which is configured to use measurement data calculated by the calculation unit to manufacture a product related to a shape of the target object.

9. A method comprising:
obtaining image data in which a target object is photographed and full length data of the target object;
extracting shape data indicating a shape of the target object from the image data;
converting the shape data based on the full length data; and
calculating measurement data of each portion of the target object using a value of each of the reduced dimensions and a weighting factor optimized for each portion of the target object after performing a dimensionality reduction of the converted shape data; wherein
the calculating includes:
performing a first dimensionality reduction on the shape data converted in the converting;
performing a linear combination of a value of each dimension obtained in the first dimensionality reduction and a weighting factor optimized for each portion of the target object to obtain a predetermined value, or generate a secondary feature value from a value of each dimension obtained in the first dimensionality reduction and combine the secondary feature value and a weighting factor optimized for each portion of the target object to obtain a predetermined value;
using the predetermined value and attribute data including at least an attribute of a length and a weight of the target object to perform a second dimensionality reduction; and
calculating measurement data of each portion of the target object based on a value of each dimension obtained by the second dimensionality reduction.

10. The method according to claim 9, wherein the extracting includes using an algorithm of semantic segmentation built with teacher data prepared for each type of a target object to extract a target object area included in the image data, so as to extract shape data of the target object.

11. The method according to claim 9, wherein the target object is a person.

12. The method according to claim 9, wherein the image data includes a depth map, and shape data extracted in the extracting is associated with depth data of the target object in the depth map.

13. The method according to claim 12, wherein the extracting includes extracting a target object area of the target object from the image data based on the depth map, wherein in the target object area the shape data is associated with depth data of the target object.

14. The method according to claim 13, wherein the converting includes converting the shape data into new shape data based on the full length data and depth data of the target object area.

15. The method according to claim 9, comprising using measurement data calculated in the calculating to manufacture a product related to a shape of the target object.

16. The apparatus according to claim 2, wherein the extraction unit is configured to use an algorithm of semantic segmentation built with teacher data prepared for each type of a target object to extract a target object area included in the image data, so as to extract shape data of the target object.

17. The apparatus according to claim 2, wherein the target object is a person.

18. The apparatus according to claim 2, wherein the image data includes a depth map, and shape data extracted by the extraction unit is associated with depth data of the target object in the depth map.

19. The apparatus according to claim 2, which is configured to use measurement data calculated by the calculation unit to manufacture a product related to a shape of the target object.

* * * * *